(12) United States Patent
Eguchi

(10) Patent No.: US 8,675,278 B2
(45) Date of Patent: Mar. 18, 2014

(54) HIGH ZOOM-RATIO ZOOM LENS SYSTEM

(75) Inventor: Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 168 days.

(21) Appl. No.: 13/214,450

(22) Filed: Aug. 22, 2011

(65) Prior Publication Data

US 2012/0050864 A1 Mar. 1, 2012

(30) Foreign Application Priority Data

Aug. 27, 2010 (JP) ................................. 2010-191007

(51) Int. Cl.
*G02B 27/64* (2006.01)
*G02B 15/14* (2006.01)

(52) U.S. Cl.
CPC .............. *G02B 27/64* (2013.01); *G02B 15/14* (2013.01); *G02B 27/646* (2013.01)
USPC ............ 359/557; 359/554; 359/676; 359/687

(58) Field of Classification Search
USPC ........................... 359/554, 557, 676, 686–687
See application file for complete search history.

(56) References Cited

U.S. PATENT DOCUMENTS

| | | | | |
|---|---|---|---|---|
| 7,088,522 | B2 * | 8/2006 | Hamano | 359/687 |
| 2008/0111909 | A1 * | 5/2008 | Miyajima | 348/335 |
| 2008/0291547 | A1 | 11/2008 | Saruwatari | |
| 2009/0040622 | A1 * | 2/2009 | Iwama | 359/687 |
| 2009/0040624 | A1 | 2/2009 | Shinohara | |
| 2009/0231726 | A1 * | 9/2009 | Nanba | 359/687 |

FOREIGN PATENT DOCUMENTS

| | | |
|---|---|---|
| JP | 2003-140048 | 5/2003 |
| JP | 2004-258240 | 9/2004 |
| JP | 2007-122019 | 5/2007 |
| JP | 2007-212537 | 8/2007 |
| JP | 2008-292733 | 12/2008 |
| JP | 2009-42269 | 2/2009 |
| JP | 2009-075581 | 4/2009 |
| JP | 2009-223008 | 10/2009 |
| JP | 2010-014844 | 1/2010 |
| JP | 2010-160334 | 7/2010 |

OTHER PUBLICATIONS

U.S. Appl. No. 13/223,612 to Masaru Eguchi, which was filed on Sep. 1, 2011.
Japan Office Action dated Dec. 3, 2013 along with an English language translation thereof.

* cited by examiner

*Primary Examiner* — Thong Nguyen
(74) *Attorney, Agent, or Firm* — Greenblum & Bernstein, P.L.C.

(57) ABSTRACT

A high zoom-ratio zoom lens system includes a positive first lens group, a negative second lens group, a positive third lens group and a positive fourth lens group, in that order from the object side. Upon zooming from the short focal length extremity to the long focal length extremity, at least the first through third lens groups move along the optical axis direction in a manner so that the distance between the first lens group and the second lens group increases, the distance between the second lens group and the third lens group decreases, and the distance between the third lens group and the fourth lens group increases, wherein the amount of movement of the first lens group during zooming is larger than that of the third lens group.

6 Claims, 36 Drawing Sheets

FNO.=1:6.0

-0.2  0.2
SPHERICAL
ABERRATION
CHROMATIC
ABERRATION

Y=3.875

—— d Line
······ g Line
---- C Line

-0.01  0.01
LATERAL
CHROMATIC
ABERRATION

Y=3.875

—— S
······ M

-0.3  0.3
ASTIGMATISM

Y=3.875

-20.0  20.0%
DISTORTION

Y= 0.00

+0.03
-0.03

Y= 1.60

+0.03
-0.03

Y= 3.10

+0.03
-0.03

Y= 3.88

+0.03
-0.03

—— d Line

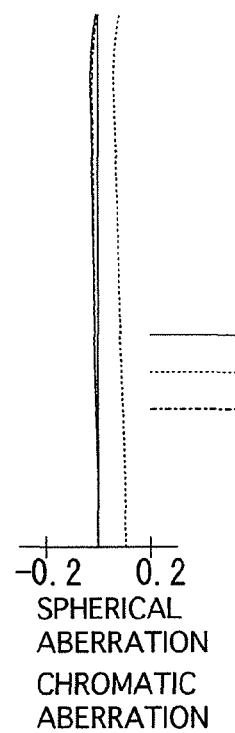
Fig. 5A
FNO.=1:5.0
-0.2  0.2
SPHERICAL
ABERRATION
CHROMATIC
ABERRATION
— d Line
······· g Line
----- C Line
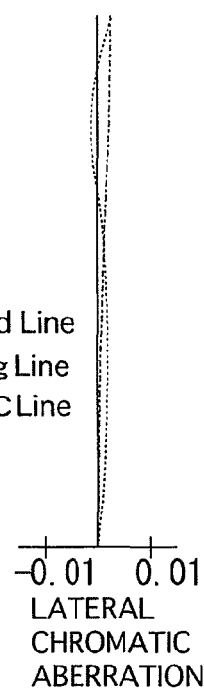
Fig. 5B
Y=3.875
-0.01  0.01
LATERAL
CHROMATIC
ABERRATION
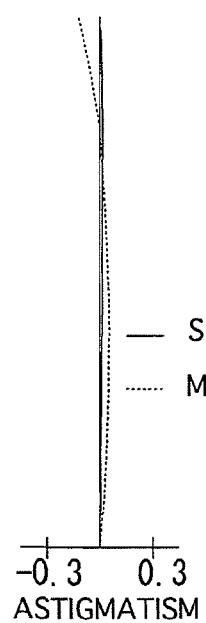
Fig. 5C
Y=3.875
-0.3  0.3
ASTIGMATISM
— S
---- M
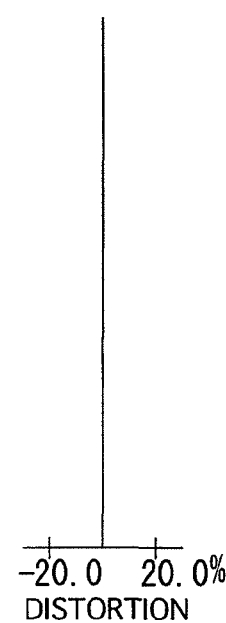
Fig. 5D
Y=3.875
-20.0  20.0%
DISTORTION
Fig. 6A
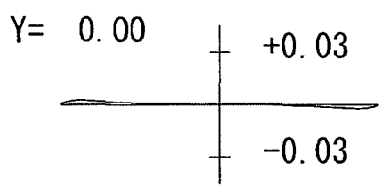
Y= 0.00   +0.03 / -0.03
Fig. 6B
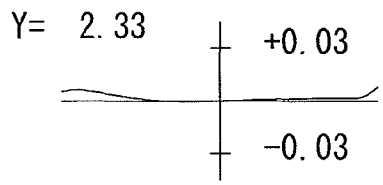
Y= 2.33   +0.03 / -0.03
Fig. 6C
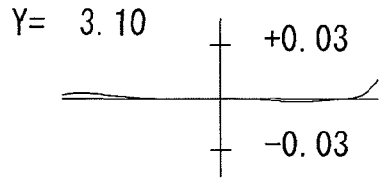
Y= 3.10   +0.03 / -0.03
Fig. 6D
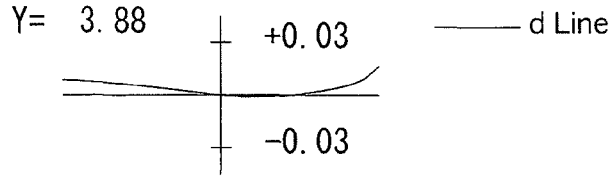
Y= 3.88   +0.03 / -0.03    — d Line

FNO.=1:3.6

-0.2  0.2
SPHERICAL
ABERRATION
CHROMATIC
ABERRATION

Y=3.7

— d Line
······ g Line
--- C Line

-0.01  0.01
LATERAL
CHROMATIC
ABERRATION

Y=3.7

— S
······ M

-0.3  0.3
ASTIGMATISM

Y=3.7

-20.0  20.0%
DISTORTION

Y= 0.00

+0.03
-0.03

Y= 2.33

+0.03
-0.03

Y= 3.10

+0.03
-0.03

Y= 3.70

+0.03
-0.03
— d Line

Fig. 10A  Y= 0.00 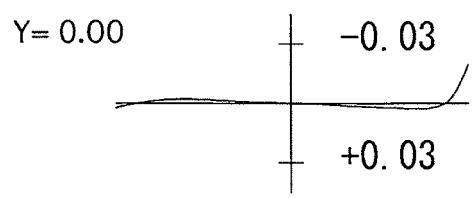
Fig. 10B  Y= 1.60 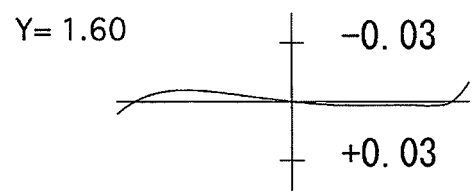
Fig. 10C  Y= 3.10 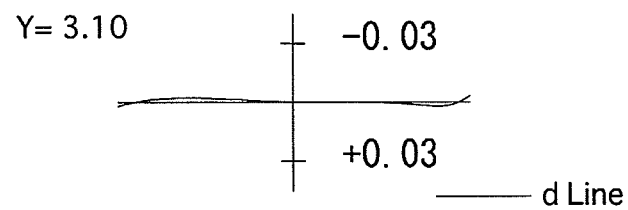
——— d Line
Fig. 10D  Y= 3.88 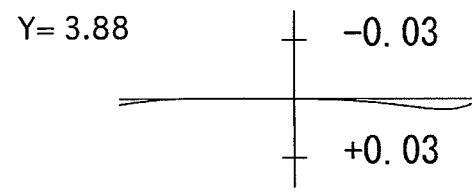

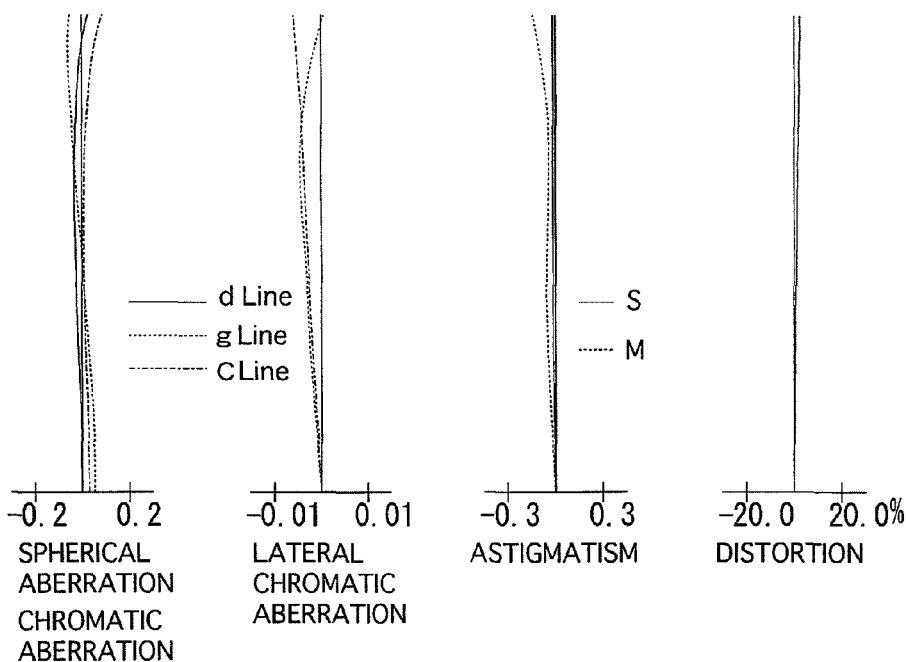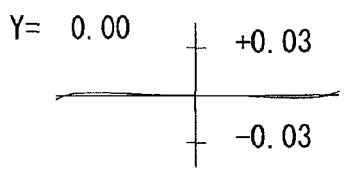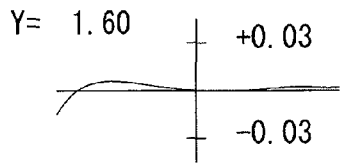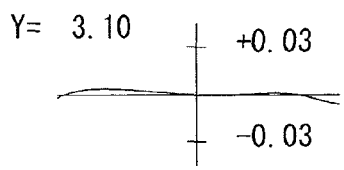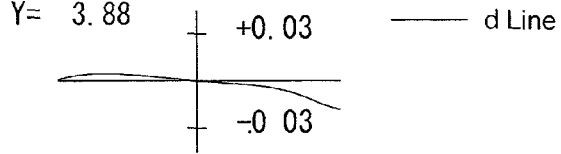

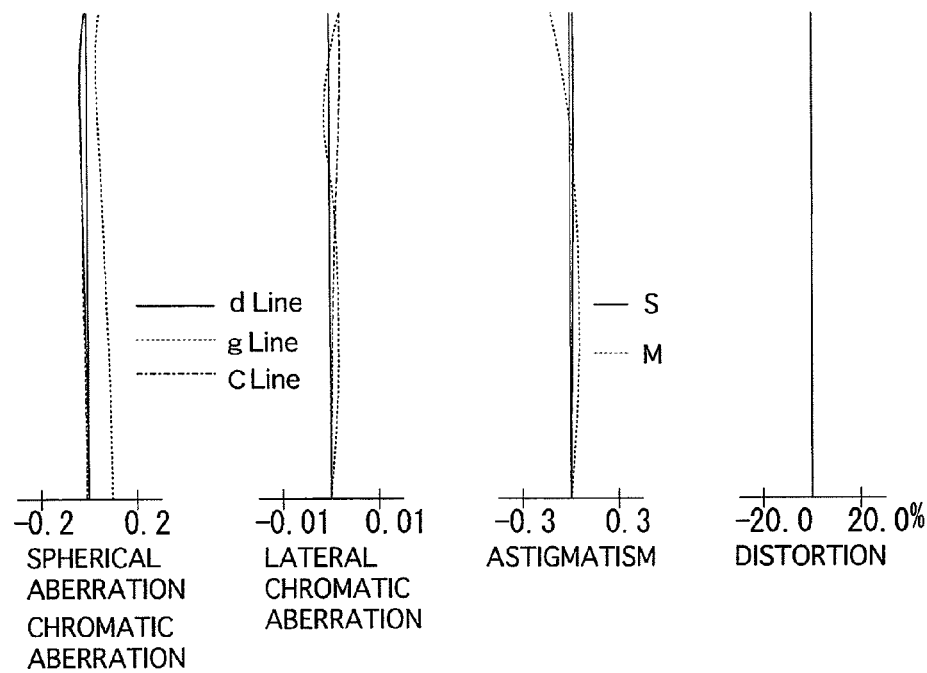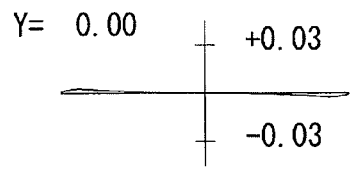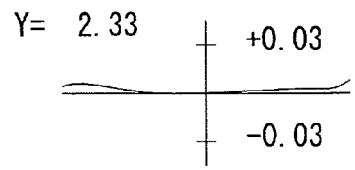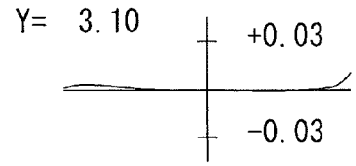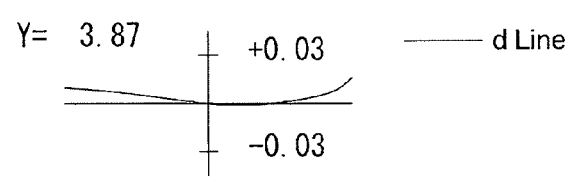

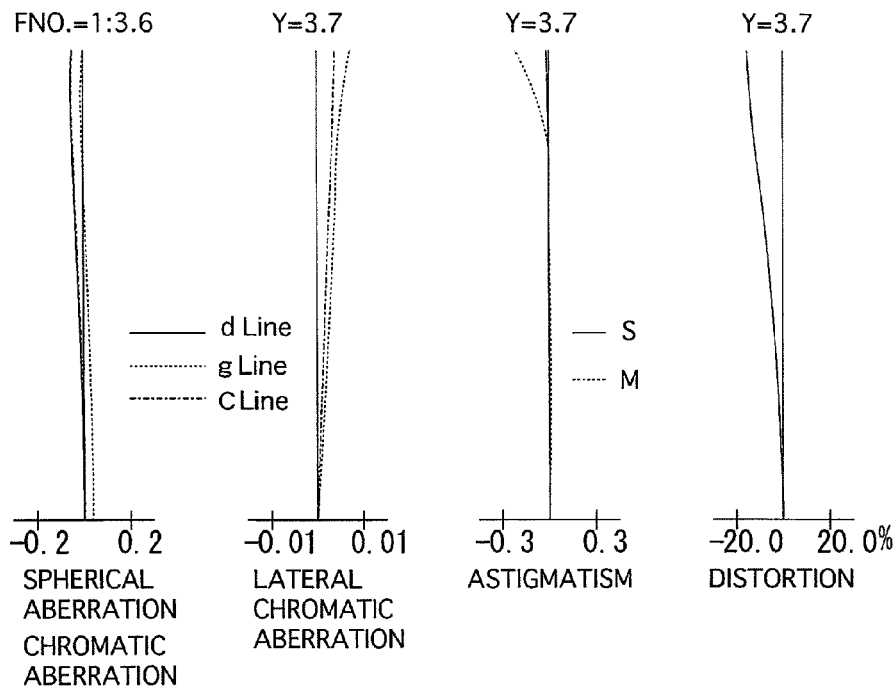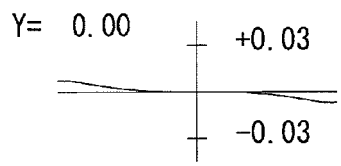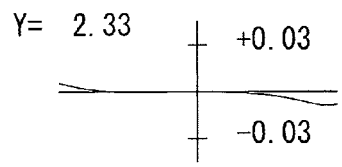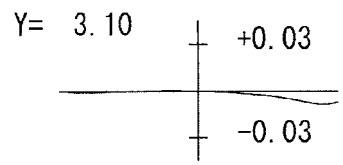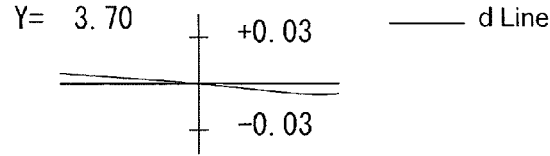

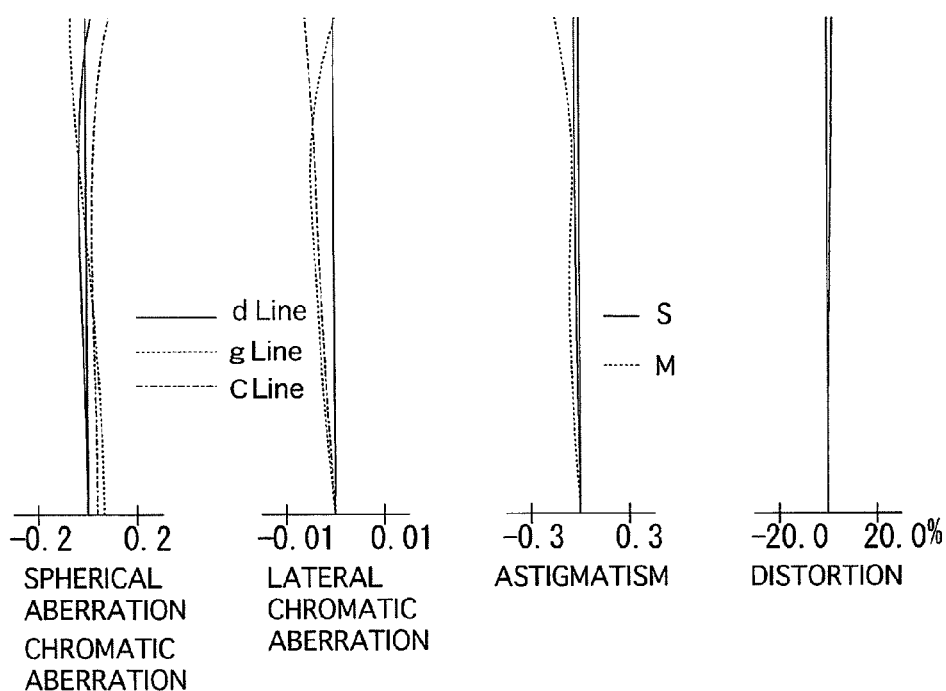
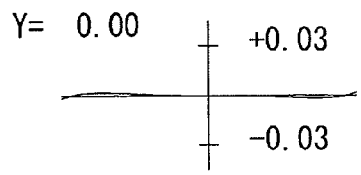
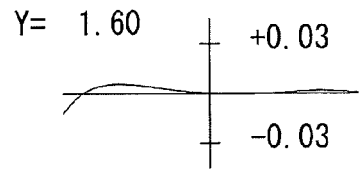
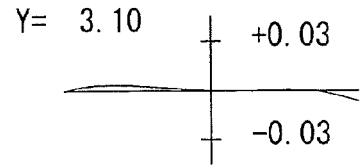
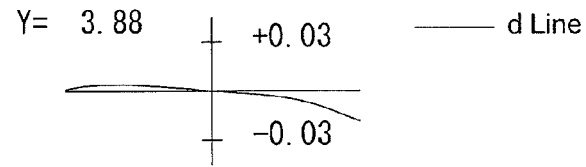

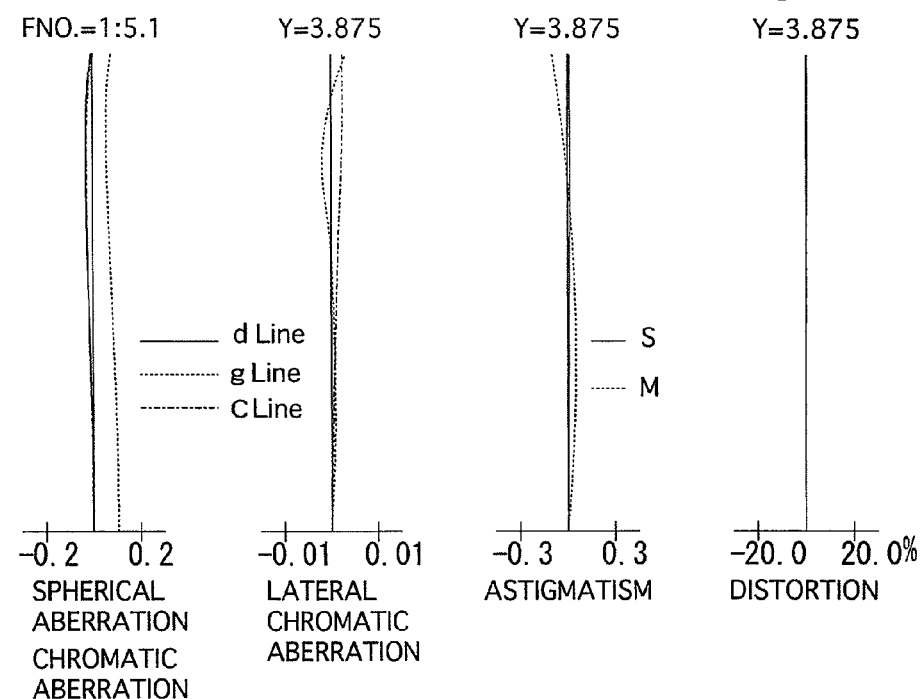
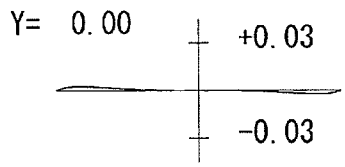
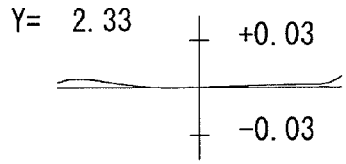
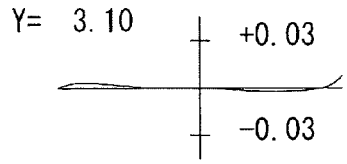
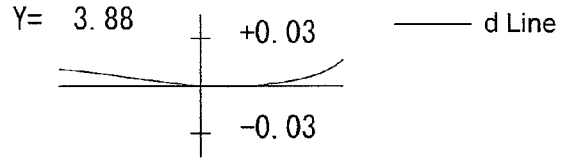

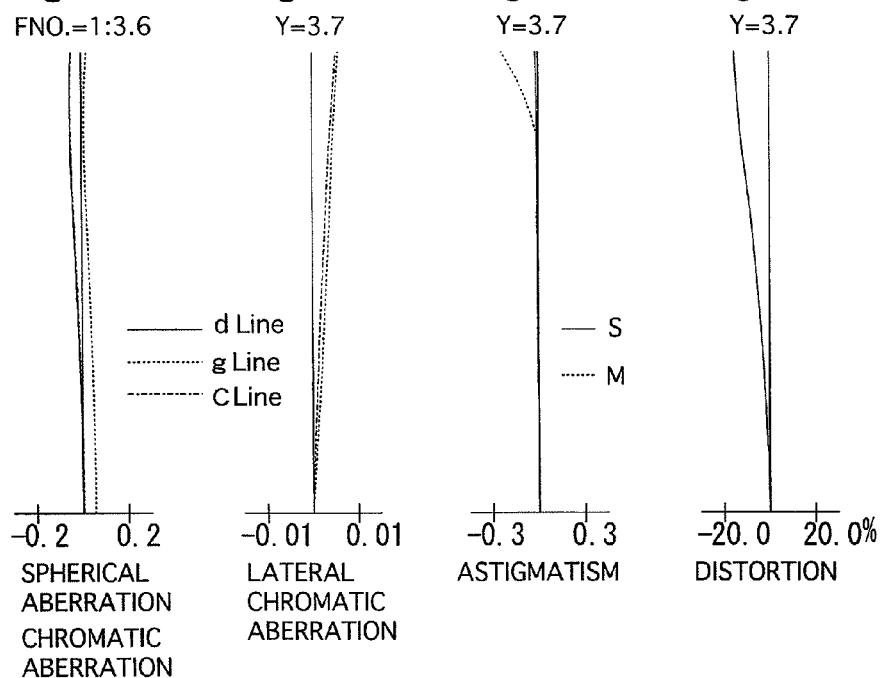
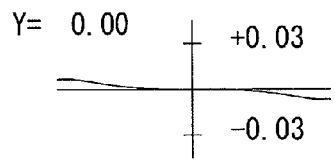
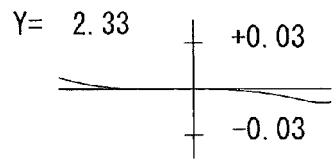
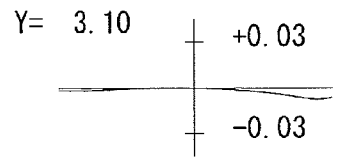
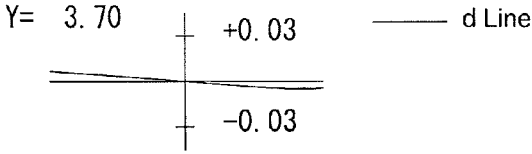

Y= 0.00

Y= 1.60

Y= 3.10

——— d Line

Y= 3.88

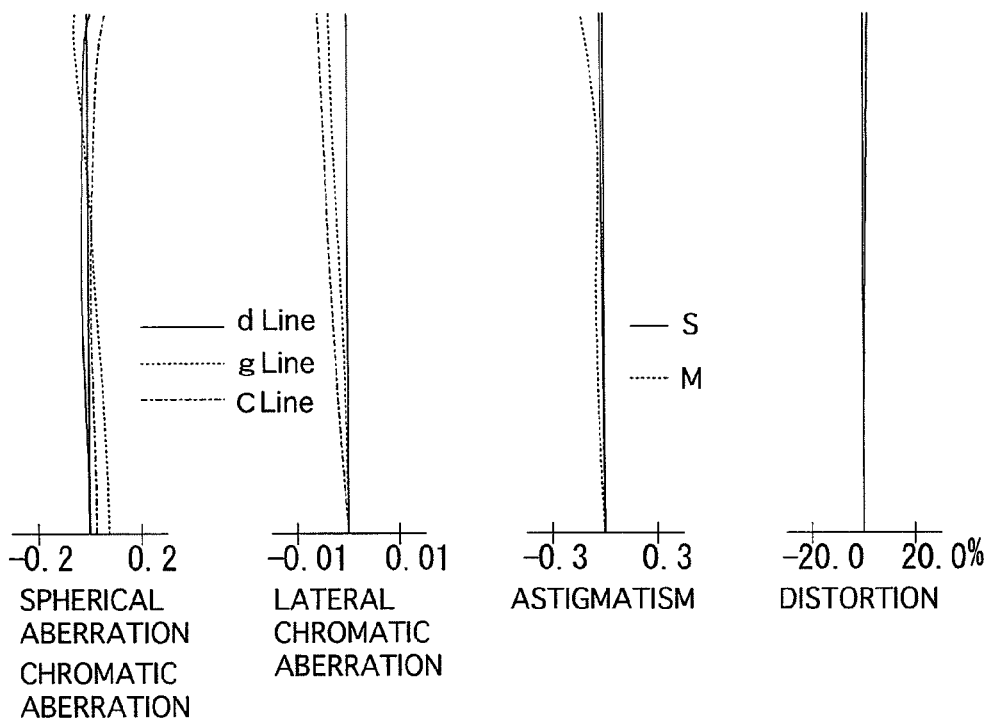
Fig. 32A FNO.=1:6.0 — SPHERICAL ABERRATION CHROMATIC ABERRATION
Fig. 32B Y=3.875 — LATERAL CHROMATIC ABERRATION
Fig. 32C Y=3.875 — ASTIGMATISM
Fig. 32D Y=3.875 — DISTORTION
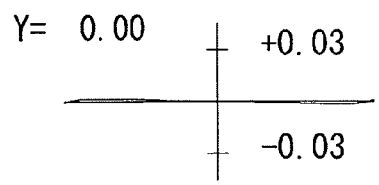
Fig. 33A
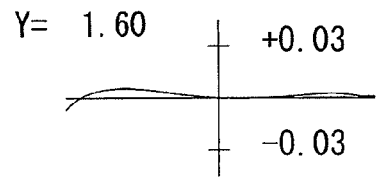
Fig. 33B
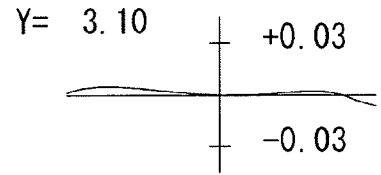
Fig. 33C
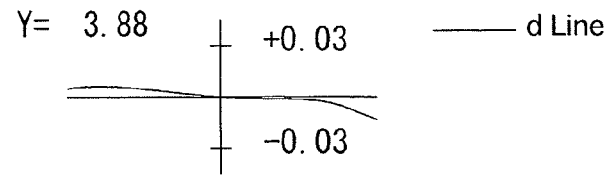
Fig. 33D

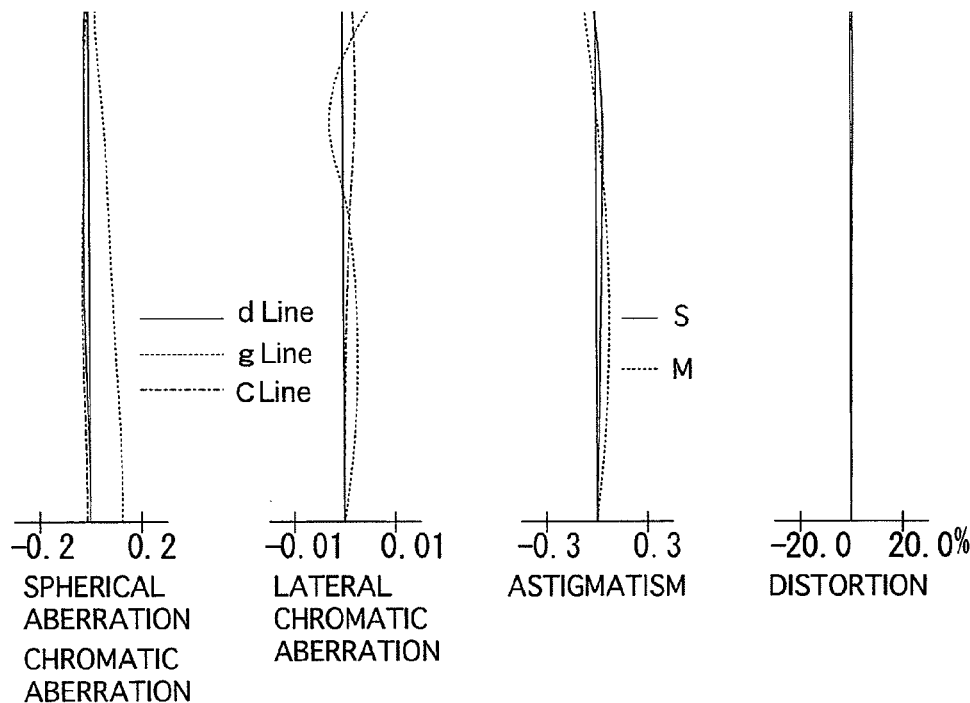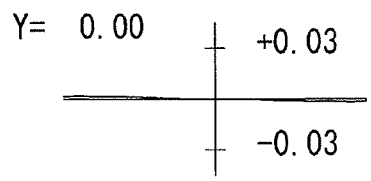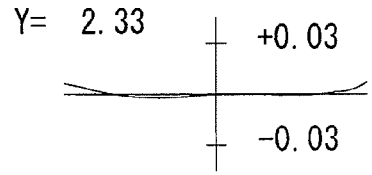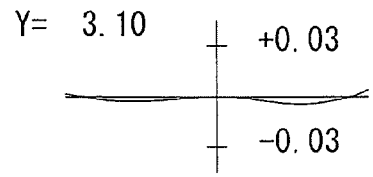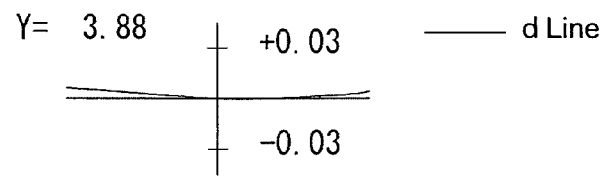

Fig. 40A  Y= 0.00 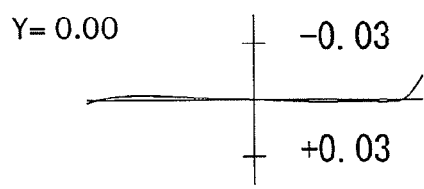
Fig. 40B  Y= 1.60 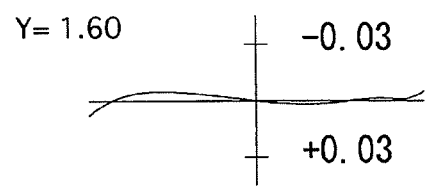
Fig. 40C  Y= 3.10 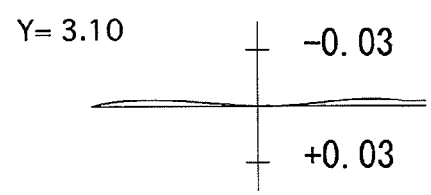
——— d Line
Fig. 40D  Y= 3.88 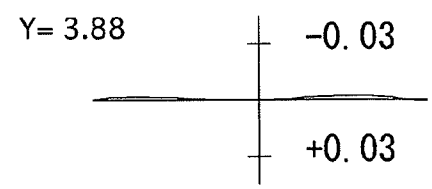

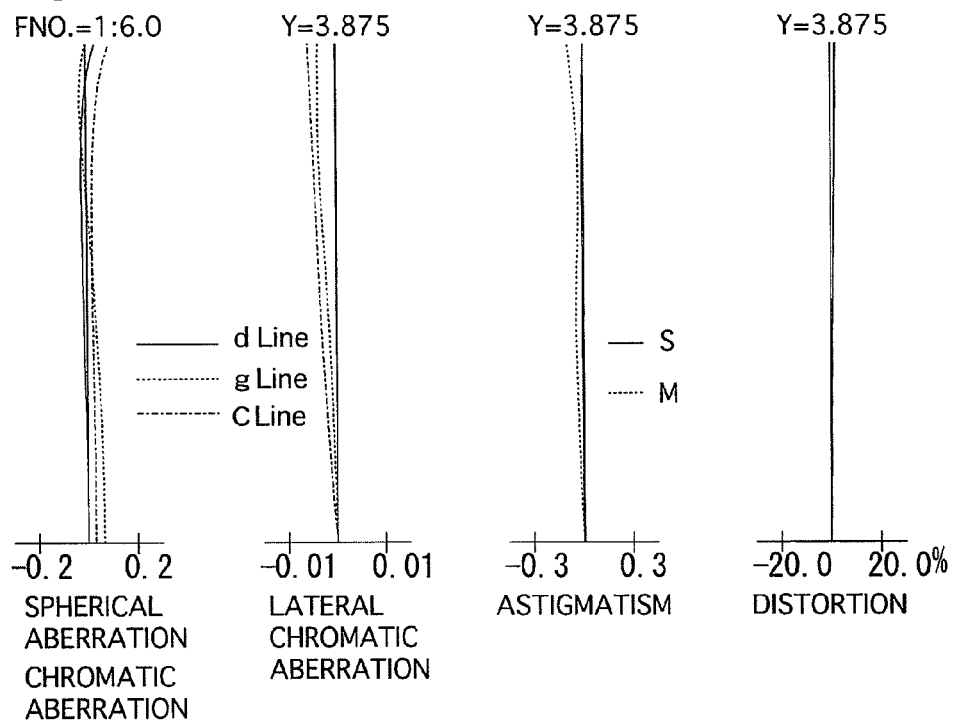
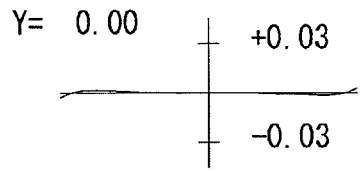
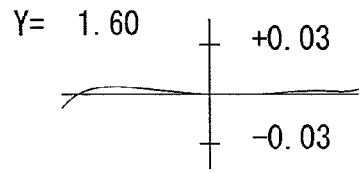
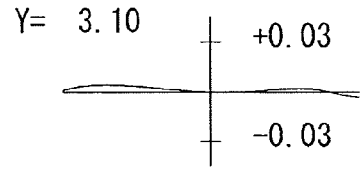
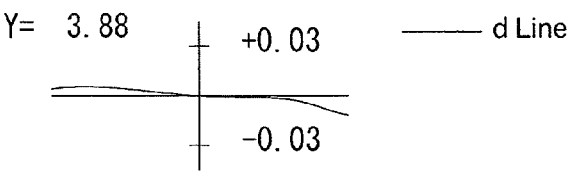

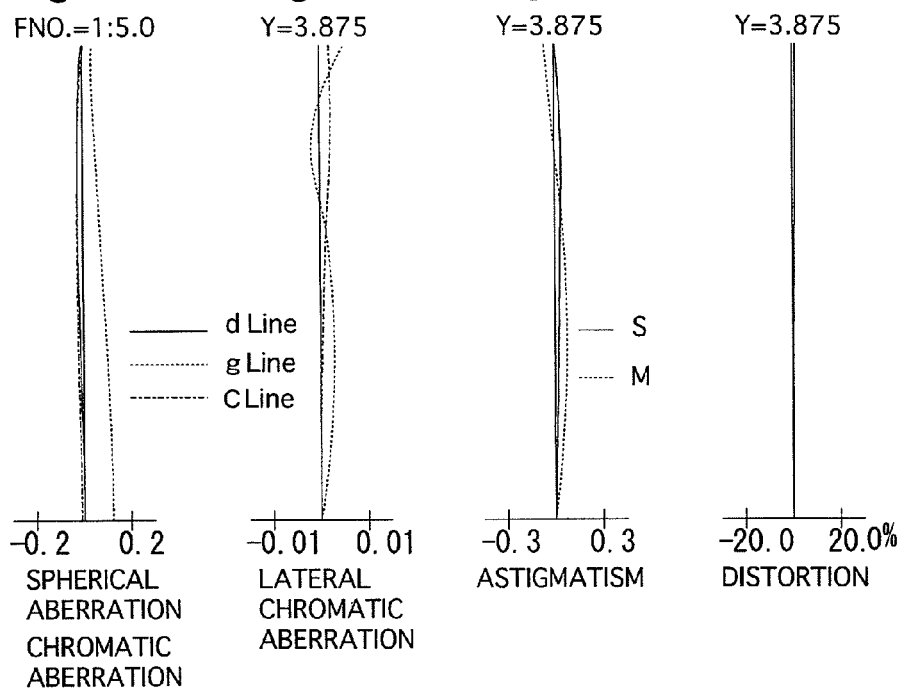
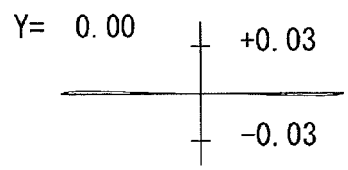
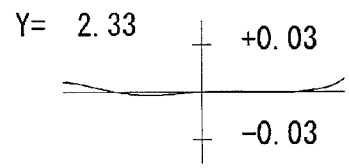
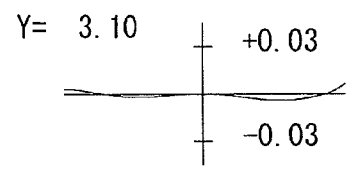
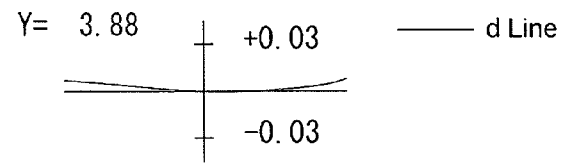

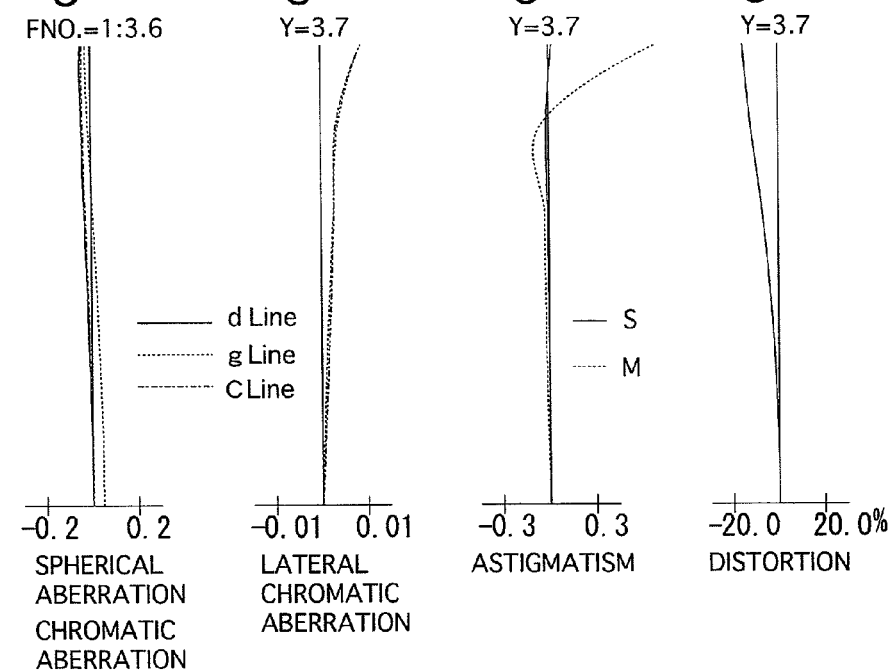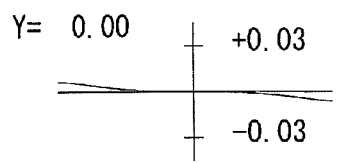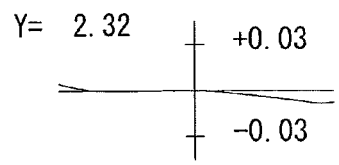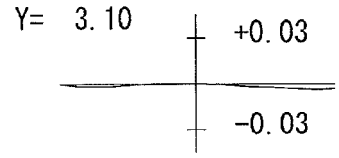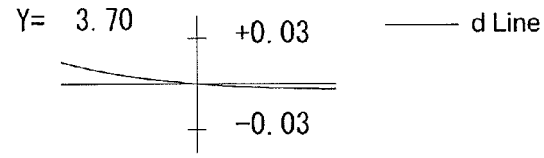

HIGH ZOOM-RATIO ZOOM LENS SYSTEM

BACKGROUND OF THE INVENTION

1. Field of the Invention

The present invention relates to a high zoom-ratio zoom lens system which is suitable as an imaging optical system for use mainly with an imaging sensor, the high zoom-ratio zoom lens system having a wide angle-of-view of a half angle-of-view of approximately 35 degrees.

2. Description of Related Art

In recent years, there has been an increased need for digital cameras that have a high zoom-ratio zoom lens system having a zoom ratio of 10:1 or more. Furthermore, there is a strong demand for a wider angle-of-view; high zoom-ratio zoom lens systems having an angle-of-view of 70 degrees or more have become popular. In addition, further advancements in the miniaturization of the pixel pitch have been made, requiring the optical system to have a higher resolution. In an imaging lens system that is for use mainly in a compact camera, it is common for such a compact camera to achieve a slim design via the employment of a retractable barrel mechanism, in which the air-distances between lens groups are reduced at a lens barrel retracted state (accommodated state). However, when designing a zoom lens system which is suitable for such a retractable barrel mechanism, in addition to reducing the thickness of each lens group in a lens system, it is also necessary for the frontmost lens to be small in diameter, and furthermore, for this lens system to be designed with consideration of the mechanical restrictions in regard to the overall length thereof.

Japanese Unexamined Patent Publication Nos. 2008-292733 and 2009-42269 each discloses a zoom lens system which achieves a zoom ratio of approximately 15:1 through 20:1. However, in the zoom lens system of the above-mentioned Japanese Unexamined Patent Publication No. 2008-292733, although the zoom ratio is sufficient, the angle-of-view is only approximately 60 degrees, and hence does not satisfy the specifications required for a wide angle-of-view. In regard to the zoom lens system that is disclosed in the above-mentioned Japanese Unexamined Patent Publication No. 2009-42269, although this zoom lens system achieves a high zoom ratio and a wide angle-of-view, the overall length of the zoom lens system at the long focal length extremity is either longer or approximately the same as the focal length thereof, so that such a zoom lens system does not sufficiently achieve miniaturization.

In addition, an image-stabilizing function is demanded in a high zoom-ratio zoom lens system, and hence, it becomes an important issue to maintain sufficient optical quality during image-stabilizing operations while also achieving a miniaturized zoom lens system. For example, in Japanese Unexamined Patent Publication No. 2003-140048, an image-stabilizing mechanism is disclosed in which a zoom lens system having a positive first lens group, a negative second lens group, a positive third lens group and a positive fourth lens group, the third lens group thereof is divided into a positive first sub-lens group and a negative second sub-lens group; the angle of incidence of the light rays onto the second sub-lens group is set to be substantially parallel to the optical axis, and deterioration in the optical quality due to image-stabilization is suppressed (corrected) by moving only the second sub-lens group in directions orthogonal to the optical axis. However, since this image-stabilizing mechanism divides the third lens group into two sub-lens groups, the mechanical arrangement therefor is complex, and the optical unit thereof is unavoidably and undesirably enlarged.

SUMMARY OF THE INVENTION

The present invention provides a compact high zoom-ratio zoom lens system having a zoom ratio of 18:1 through 20:1, an angle-of-view of 70 degrees or more at the short focal length extremity, having a small frontmost lens diameter, and which can maintain an excellent optical quality during an image-stabilizing operation with a simple structure.

According to an aspect of the present invention, a high zoom-ratio zoom lens system is provided, including a positive first lens group, a negative second lens group, a positive third lens group and a positive fourth lens group, in that order from the object side, wherein upon zooming from the short focal length extremity to the long focal length extremity, at least the first through third lens groups move along the optical axis direction in a manner so that the distance between the first lens group and the second lens group increases, the distance between the second lens group and the third lens group decreases, and the distance between the third lens group and the fourth lens group increases, wherein the amount of movement of the first lens group during zooming is larger than that of the third lens group. The lens element which is provided closest to the object side within third lens group has an aspherical surface formed on each side thereof. The third lens group is an image-shake correction lens group which is moved in a direction orthogonal to the optical axis to change the imaging position in order to correct image shake.

It is desirable for the following condition (1) to be satisfied:

$$1.5 < (1 - M3t) \cdot M4t < 3 \tag{1},$$

wherein M3t designates the lateral magnification of the third lens group when focusing on an object at infinity at the long focal length extremity, and M4t designates the lateral magnification of the fourth lens group when focusing on an object at infinity at the long focal length extremity.

It is desirable for the following condition (2) to be satisfied:

$$v3Pa > 64 \tag{2},$$

wherein ν3Pa designates the average Abbe number with respect to the d-line of the positive lens elements which are provided in the third lens group.

It is desirable for the following condition (3) to be satisfied:

$$0.35 < n3Na - n3Pa \tag{3},$$

wherein n3Na designates the average refractive index at the d-line of the negative lens elements which are provided within the third lens group, and n3Pa designates the average refractive index at the d-line of the positive lens elements which are provided within the third lens group.

It is desirable for the following conditions (4), (5) and (6) to be satisfied:

$$-8 < F1/F2 < -5 \tag{4};$$

$$0.2 < (M3t/M3w)/(M2t/M2w) < 0.4 \tag{5};$$

$$v1P1 > 90 \tag{6},$$

wherein F1 designates the focal length of the first lens group, F2 designates the focal length of the second lens group, M3t designates the lateral magnification of the third lens group when focusing on an object at infinity at the long focal length extremity, M3w designates the lateral magnification of the third lens group when focusing on an object at infinity at the short focal length extremity, M2t designates the lateral magnification of the second lens group when focusing on an object at infinity at the long focal length extremity, M2w designates the lateral magnification of the second lens group when focusing on an object at infinity at the short focal length extremity, and v1P1 designates the Abbe number with respect to the d-line of the positive lens element which is provided closest to the object side within the first lens group.

It is desirable for the third lens group to include a positive lens element, a cemented lens provided with a positive lens element and a negative lens element; and a negative lens element, in that order from the object side.

It is desirable for the third lens group to include a positive lens element, and a cemented lens provided with a positive lens element and a negative lens element, in that order from the object side.

According to the present invention, a compact high zoom-ratio zoom lens system is achieved, having a zoom ratio of 18:1 through 20:1, an angle-of-view of 70 degrees or more at the short focal length extremity, having a small frontmost lens diameter, and which can maintain an excellent optical quality during an image-stabilizing operation with a simple structure.

The present disclosure relates to subject matter contained in Japanese Patent Application No. 2010-191007 (filed on Aug. 27, 2010) which is expressly incorporated herein in its entirety.

BRIEF DESCRIPTION OF THE DRAWINGS

The present invention will be discussed below in detail with reference to the accompanying drawings, in which:

FIGS. 5A, 5B, 5C and 5D show various aberrations that occurred in the lens arrangement shown in FIG. 4;

FIGS. 6A, 6B, 6C and 6D show lateral aberrations that occurred in the lens arrangement shown in FIG. 4;

FIGS. 10A, 10B, 10C and 10D show lateral aberrations that occurred in the lens arrangement of the first numerical embodiment upon an image-stabilizing operation being carried out at the long focal length extremity;

FIGS. 12A, 12B, 12C and 12D show various aberrations that occurred in the lens arrangement shown in FIG. 11;

FIGS. 13A, 13B, 13C and 13D show lateral aberrations that occurred in the lens arrangement shown in FIG. 11;

FIGS. 15A, 15B, 15C and 15D show various aberrations that occurred in the lens arrangement shown in FIG. 14;

FIGS. 16A, 16B, 16C and 16D show lateral aberrations that occurred in the lens arrangement shown in FIG. 14;

FIGS. 18A, 18B, 18C and 18D show various aberrations that occurred in the lens arrangement shown in FIG. 17;

FIGS. 19A, 19B, 19C and 19D show lateral aberrations that occurred in the lens arrangement shown in FIG. 17;

FIGS. 22A, 22B, 22C and 22D show various aberrations that occurred in the lens arrangement shown in FIG. 21;

FIGS. 23A, 23B, 23C and 23D show lateral aberrations that occurred in the lens arrangement shown in FIG. 21;

FIGS. 25A, 25B, 25C and 25D show various aberrations that occurred in the lens arrangement shown in FIG. 24;

FIGS. 26A, 26B, 26C and 26D show lateral aberrations that occurred in the lens arrangement shown in FIG. 24;

FIGS. 28A, 28B, 28C and 28D show various aberrations that occurred in the lens arrangement shown in FIG. 27;

FIGS. 29A, 29B, 29C and 29D show lateral aberrations that occurred in the lens arrangement shown in FIG. 27;

FIGS. 32A, 32B, 32C and 32D show various aberrations that occurred in the lens arrangement shown in FIG. 31;

FIGS. 33A, 33B, 33C and 33D show lateral aberrations that occurred in the lens arrangement shown in FIG. 31;

FIGS. 35A, 35B, 35C and 35D show various aberrations that occurred in the lens arrangement shown in FIG. 34;

FIGS. 36A, 36B, 36C and 36D show lateral aberrations that occurred in the lens arrangement shown in FIG. 34;

FIGS. 40A, 40B, 40C and 40D show lateral aberrations that occurred in the lens arrangement of the fourth numerical embodiment upon an image-stabilizing operation being carried out at the long focal length extremity;

FIGS. 42A, 42B, 42C and 42D show various aberrations that occurred in the lens arrangement shown in FIG. 41;

FIGS. 43A, 43B, 43C and 43D show lateral aberrations that occurred in the lens arrangement shown in FIG. 41;

FIGS. 45A, 45B, 45C and 45D show various aberrations that occurred in the lens arrangement shown in FIG. 44;

FIGS. 46A, 46B, 46C and 46D show lateral aberrations that occurred in the lens arrangement shown in FIG. 44;

FIGS. 48A, 48B, 48C and 48D show various aberrations that occurred in the lens arrangement shown in FIG. 47;

FIGS. 49A, 49B, 49C and 49D show lateral aberrations that occurred in the lens arrangement shown in FIG. 47;

DESCRIPTION OF THE EMBODIMENTS

Figure 51:
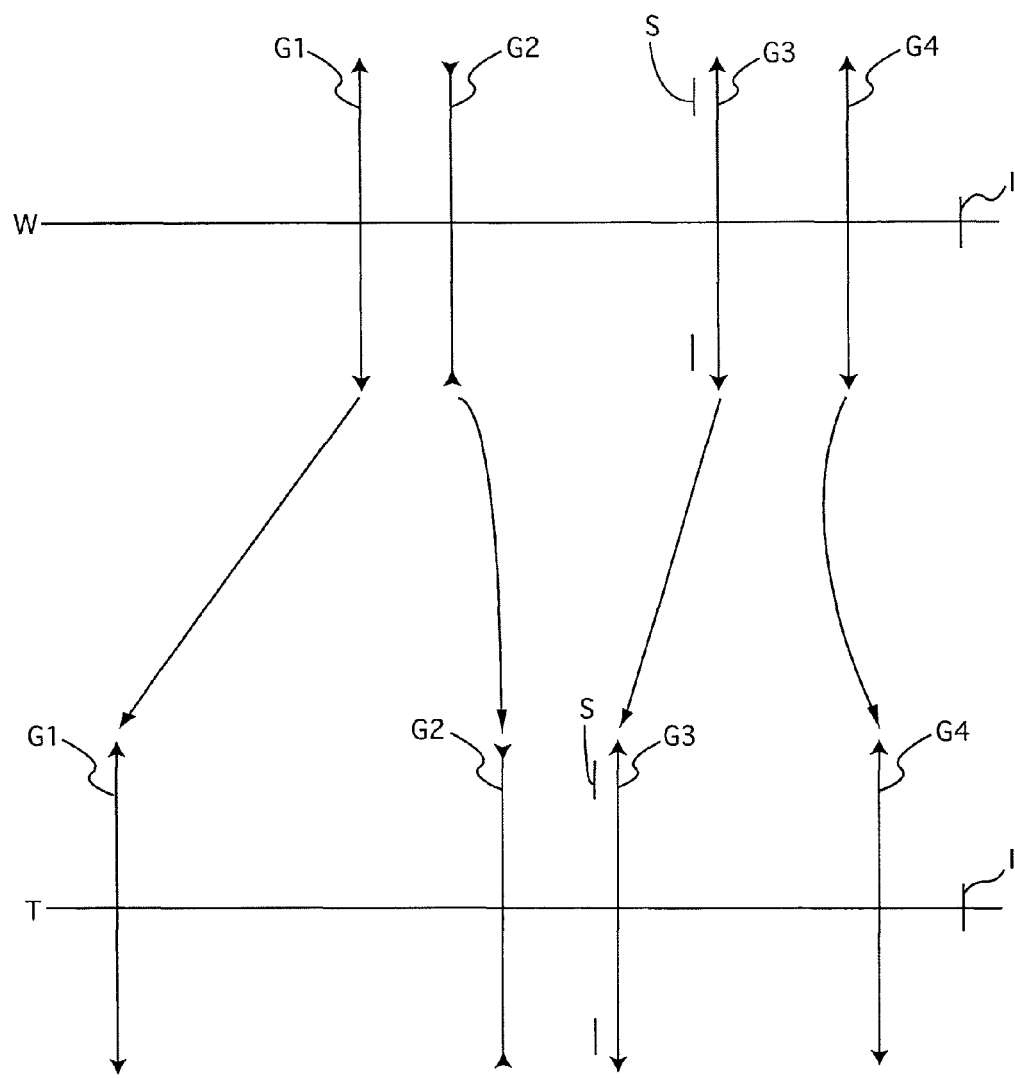
FIG. 51 shows a zoom path of the high zoom-ratio zoom lens system according to the present invention.

The high zoom-ratio zoom lens system according to the present invention, as shown in the zoom path of FIG. 51, is configured of a positive first lens group G1, a negative second lens group G2, a positive third lens group G3 and a positive fourth lens group G4, in that order from the object side. A diaphragm S is provided in between the second lens group G2 and the third lens group G3 and moves integrally with the third lens group G3 along the optical axis. Focusing is performed by the fourth lens group G4. "I" designates the imaging plane of the high zoom-ratio zoom lens system.

Upon zooming from the short focal length extremity (W) to the long focal length extremity (T), the first through fourth lens groups G1 through G4 move along the optical axis direction in a manner in which the distance between the first lens group G1 and the second lens group G2 increases, the distance between the second lens group G2 and the third lens group G3 decreases, and the distance between the third lens group G3 and the fourth lens group G4 increases. More specifically, upon zooming from the short focal length extremity (W) to the long focal length extremity (T), the first lens group G1 moves monotonically toward the object side, the second lens group G2 moves toward the image side while plotting a convex curve that faces the image side, the third lens group G3 monotonically moves toward the object side, and the fourth lens group first moves toward the object side and thereafter moves toward the image side. The amount of movement of the first lens group G1 during zooming (telescoping amount toward the object side) is larger than the amount of movement of the third lens group G3 (telescoping amount toward the object side). Note that the movement path of the second lens group G2 is not limited to that shown in FIG. 51, and can alternatively be, for example, a convex path facing the object side while the second lens group G2 moves along the optical axis, an S-shaped path while the second lens group G2 moves along the optical axis. However, the amount of movement of the second lens group G2 during zooming should be relatively smaller compared to those of the other lens groups.

In each of the first through fifth numerical embodiments, the first lens group G1 is configured of a negative lens element 11, a positive lens element 12 and a positive lens element 13, in that order from the object side.

In each of the first through fifth numerical embodiments, the second lens group G2 is configured of a negative lens element 21, a negative lens element 22, and a positive lens element 23, in that order from the object side. In each of the first through third numerical embodiments, the negative lens element 21 has spherical surfaces, and in the fourth and fifth numerical embodiments, the negative lens element 21 has an aspherical surface on the object side thereof. In each of the first through fifth numerical embodiments, the positive lens element 23 has an aspherical surface on each side thereof.

In each of the first through third numerical embodiments, the third lens group G3 is configured of a positive lens element 31; a cemented lens provided with a positive lens element 32 and a negative lens element 33; and a negative lens element 34, in that order from the object side. The positive lens element 31, which is provided closest to the object side (within the third lens group G3), has an aspherical surface on each side thereof.

In each of the fourth and fifth numerical embodiments, the third lens group G3 is configured of a positive lens element 31'; a cemented lens provided with a positive lens element 32' and a negative lens element 33', in that order from the object side. The positive lens element 31', which is provided closest to the object side (within the third lens group G3), has an aspherical surface on each side thereof.

In each of the first through fifth numerical embodiments, the fourth lens group G4 is configured of a positive lens element 41 and a negative lens element 42, in that order from the object side. The positive lens element 41 has an aspherical surface on the object side thereof. The negative lens element 42 has an aspherical surface on each side thereof. It is possible to configure the fourth lens group G4 out of a single positive lens element if the optical quality at the close distance is sacrificed to an extent.

The high zoom-ratio zoom lens system according to the present invention is a positive-lead lens system and has the advantage of being able to achieve a higher zoom ratio than a negative-lead lens system, which is typically used in a compact camera. However, positive-lead lens systems have the disadvantage of the frontmost lens diameter easily increasing, so that even if a multi-stage (telescoping) lens barrel is utilized in order to retract and accommodate the lens system, the diameter of the lens barrel still increases to the extent where such an enlarged lens barrel can no longer be installed into a compact camera. Hence, in order to solve this problem, by moving the first lens group G1 along the optical axis direction (advancing toward the object side) by a larger amount than that of the third lens group G3 upon zooming from the short focal length extremity to the long focal length extremity, the amount of movement freedom of the second and third lens groups G2 and G3 increases, so as to attain an optimum ratio of the zoom burden on the second and third lens groups G2 and G3. Furthermore, by configuring the third lens group G3 of three lens elements, i.e., a positive lens element, and a cemented lens provided with a positive lens element and a negative lens element, in that order from the object side, various aberrations can be favorably corrected over the entire zooming range. Furthermore, by configuring the third lens group G3 of four lens elements, i.e., a positive lens element, a cemented lens provided with a positive lens element and a negative lens element; and a negative lens element, in that order from the object side, various aberrations can be even more favorably corrected over the entire zooming range.

In the present invention, an arrangement is employed in which the entire third lens group G3 is moved in a direction orthogonal to the optical axis to change the imaging position in order to correct image shake (image blur) (i.e., an arrangement in which the entire third lens group G3 constitutes an image-shake correction lens group), the mechanical arrangement therefor is simple, and is advantageous for miniaturizing the optical unit thereof. Furthermore, by configuring the third lens group G3 of either three or four lens elements, as described above, a superior optical quality can be achieved even in a state where the entire third lens group G3 is eccentrically deviated in order to correct image shake (image blur). Furthermore, it is possible to prevent deterioration of the imaging quality when the third lens group G3 is eccentrically deviated by forming an aspherical surface on each side of the positive lens element which is provided closest to the object side within the third lens group G3.

Condition (1) specifies the image-shake sensitivity of the third lens group G3, which constitutes a image-stabilizing lens group, at the long focal length extremity, and achieves a high zoom ratio while achieving a high image-stabilizing precision.

If the upper limit of condition (1) is exceeded, although a high zoom ratio can be achieved, the precision of the positional control of the third lens group G3 becomes insufficient, so that favorable image-shake correction cannot be achieved, and hence, favorable imaging quality cannot be obtained. In other words, the decentration sensitivity of the third lens group G3 (image-shake correction lens group) becomes so high that the third lens group G3 cannot be correctly moved to the position at which a desired image-shake correction effect can be attained.

If the lower limit of condition (1) is exceeded, the magnification of the third lens group G3 decreases at the long focal length extremity, so that the zooming function of the third lens group G3 decreases, and a high zoom ratio cannot be achieved.

Condition (2) specifies the average Abbe number with respect to the d-line of the positive lens elements that are provided in the third lens group G3, and achieves favorable correction of chromatic aberration over the entire zooming range.

If the lower limit of condition (2) is exceeded, it becomes difficult to correct chromatic aberration that occurs in the third lens group G3 which has a relatively strong positive refractive power.

Condition (3) specifies the difference between the average refractive index at the d-line of the negative lens elements provided in the third lens group G3 and the average refractive index at the d-line of the positive lens elements provided in the third lens group G3, in order to achieve a flat imaging plane throughout the entire zooming range.

If the lower limit of condition (3) is exceeded, the Petzval sum, which specifies the flatness of the imaging plane, easily becomes negative, so that positive field curvature at the periphery of the picture plane occurs.

Condition (4) specifies the ratio of the focal length of the first lens group G1 to the focal length of the second lens group G2, and achieves a reduction in the entire length of the zoom lens system and achieves a wide angle-of-view.

If the upper limit of condition (4) is exceeded, the refractive power of the second lens group G2 becomes too weak with respect to the refractive power of the first lens group G1, which is advantageous in regard to reducing the overall length of the zoom lens system at the long focal length extremity, however, it becomes difficult to achieve a wide angle-of-view of 70 degrees or more.

If the lower limit of condition (4) is exceeded, the refractive power of the second lens group G2 becomes too strong with respect to the refractive power of the first lens group G1, the diameter of the first lens group G1 becomes large, and the overall length of the zoom lens system at the long focal length extremity becomes large. If the overall length of the zoom lens system is, nevertheless, reduced in a state where the lower limit of condition (4) is exceeded, it becomes necessary to strengthen the refractive power of each lens group and reduce the movement amount of each lens group during zooming, so that aberration correction throughout the entire zooming range becomes difficult.

Condition (5) specifies the ratio of the change in magnification of the second lens group G2 during zooming to the change in magnification of the third lens group G3 during zooming, so that by setting the ratio of the zoom burden between the second lens group G2 and the third lens group G3 to within an appropriate range, the zoom lens system can be miniaturized while achieving a high image-stabilizing precision.

If the upper limit of condition (5) is exceeded, the zoom burden on the third lens group G3 increases, the movement amount of the third lens group G3 during zooming also increases, and the fluctuation of the f-number during zooming increases, which is undesirable.

If the lower limit of condition (5) is exceeded, the zoom burden of the third lens group G3 decreases, so that it becomes difficult to achieve a high zoom-ratio zoom lens system. Nevertheless, in order to achieve a high zoom ratio with the lower limit of condition (5) exceeded, it is necessary to increase the zoom burden of the second lens group G2, however, since this would increase the diameter of the frontmost lens element (first lens group G1), a miniaturized zoom lens system cannot be achieved.

Condition (6) specifies the Abbe number with respect to the d-line of the positive lens element which is provided closest to the object side within the first lens group, and is for reducing chromatic aberration, especially at the long focal length extremity.

In order to reduce the overall length of the high zoom-ratio zoom lens system, especially the overall length at the long focal length extremity, it is necessary to strengthen the refractive power of the first lens group G1. Accordingly, correction of aberrations at the first lens group G1, especially correction of chromatic aberration, is important. The first lens group G1 is configured of three lens elements, namely, a negative lens element, a positive lens element, and a positive lens element, in that order from the object side; however, it is particularly important for the positive lens element that is provided closest to the object side to have a strong refractive power in order to achieve miniaturization of the zoom lens system. Hence, it is desirable for this positive lens element to be formed by a glass material having an Abbe number range that satisfies condition (6).

If the lower limit of condition (6) is exceeded, chromatic aberration that occurs at the first lens group G1 is not adequately corrected, so that aberrations at the second lens group G2 rearwards are enlarged, especially at the long focal length extremity, and the lack of chromatic aberration correction over the entire zoom lens system becomes prominent.

EMBODIMENTS

Specific numerical embodiments will be herein discussed. The following numerical embodiments are applied to the high zoom-ratio zoom lens system of the present invention being used in a compact digital camera. In the aberration diagrams, lateral aberration diagrams and the tables, the d-line, g-line, and C-line show aberrations at their respective wave-lengths;

S designates the sagittal image, M designates the meridional image, Fno. designates the f-number, f designates the focal length of the entire optical system, W designates the half angle of view)(°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Numerical Embodiment 1

Figure 1:
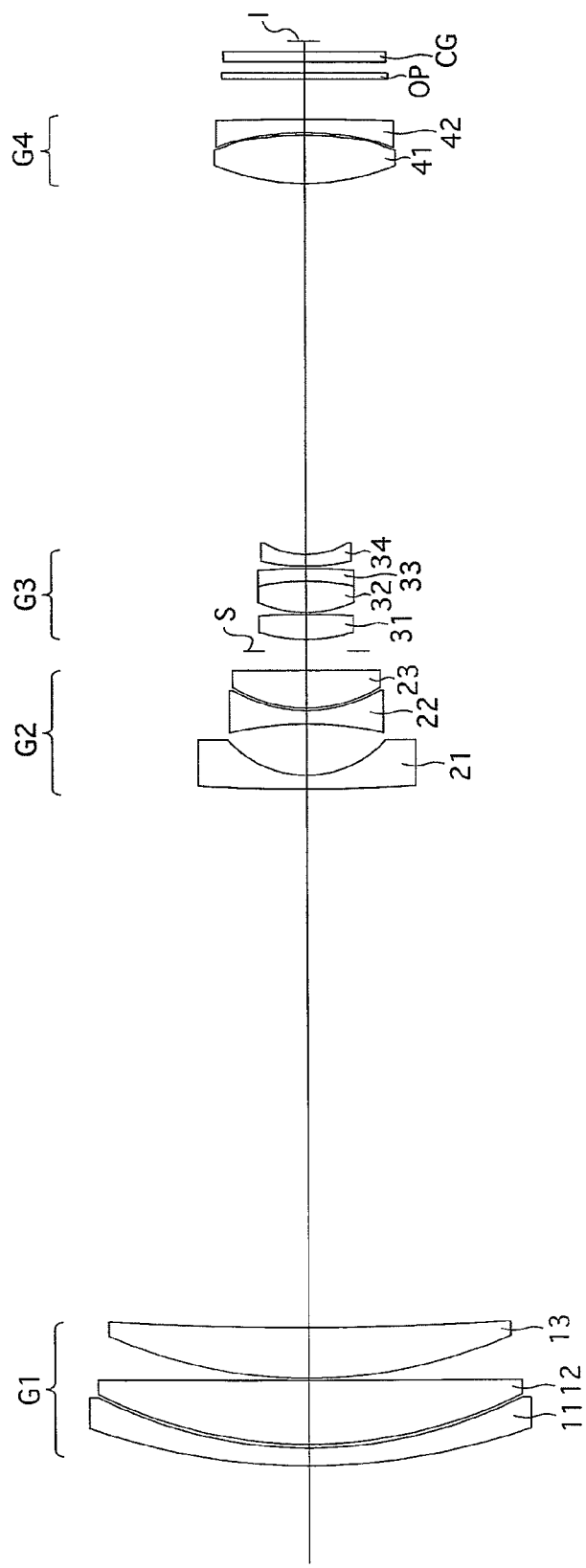
FIG. 1 shows a lens arrangement of a first numerical embodiment of a high zoom-ratio zoom lens system, according to the present invention, at the long focal length extremity when focused on an object at infinity.
Figure 2A:
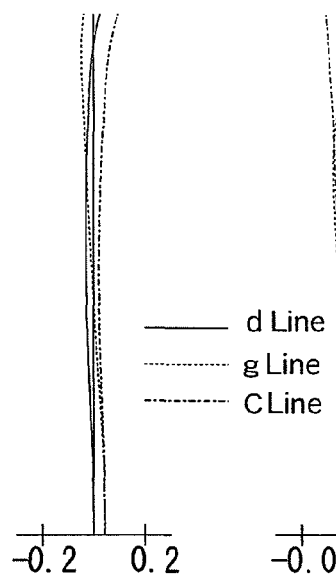
FIGS. 2A, 2B, 2C and 2D show various aberrations that occurred in the lens arrangement shown in FIG. 1.
Figure 2B:
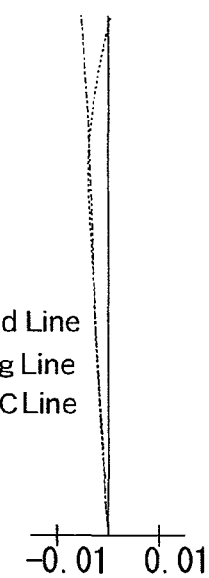
Figure 2C:
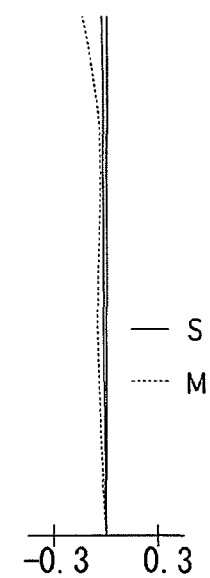
Figure 2D:
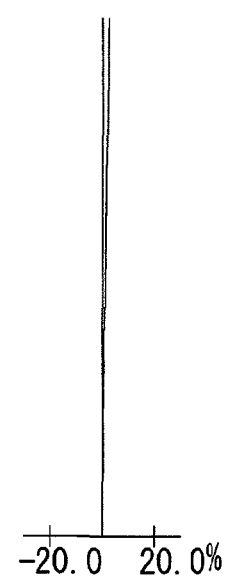
Figure 3A:
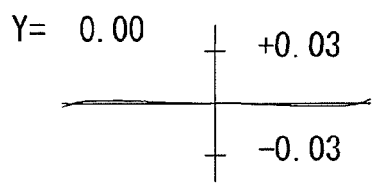
FIGS. 3A, 3B, 3C and 3D show lateral aberrations that occurred in the lens arrangement shown in FIG. 1.
Figure 3B:
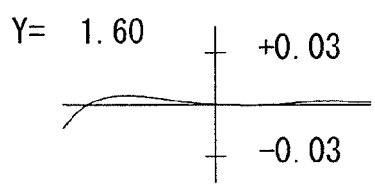
Figure 3C:
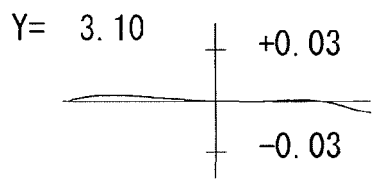
Figure 3D:
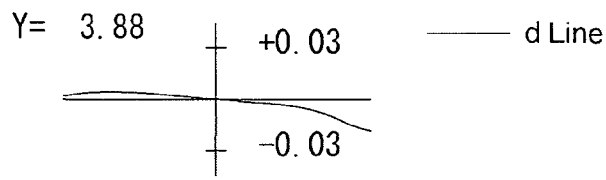
Figure 4:
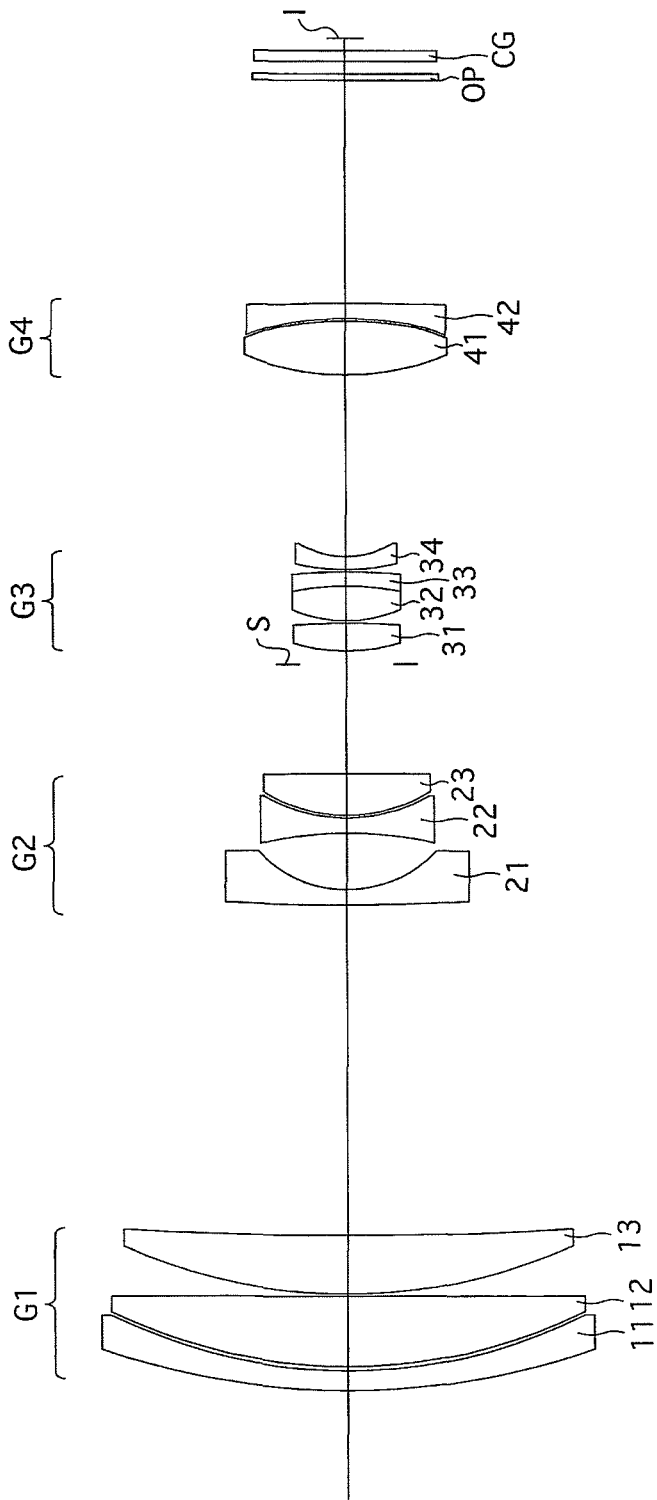
FIG. 4 shows the lens arrangement of the first numerical embodiment at an intermediate focal length when focused on an object at infinity.
Figure 7:
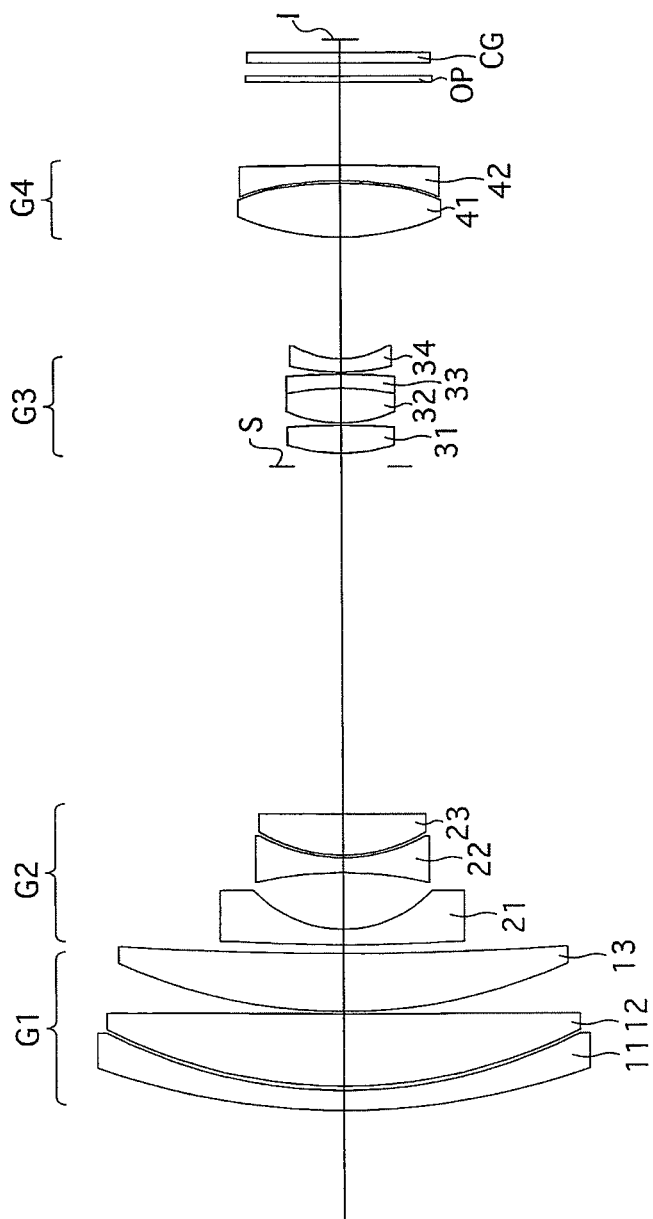
FIG. 7 shows the lens arrangement of the first numerical embodiment at the short focal length extremity when focused on an object at infinity.
Figure 8A:
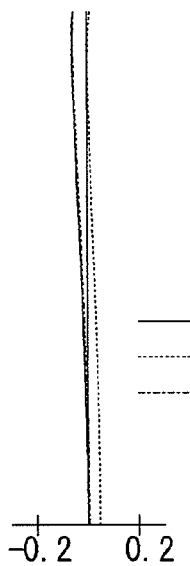
FIGS. 8A, 8B, 8C and 8D show various aberrations that occurred in the lens arrangement shown in FIG. 7.
Figure 8B:
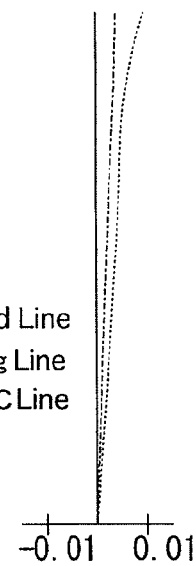
Figure 8C:
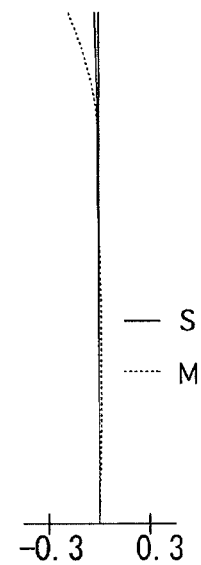
Figure 8D:
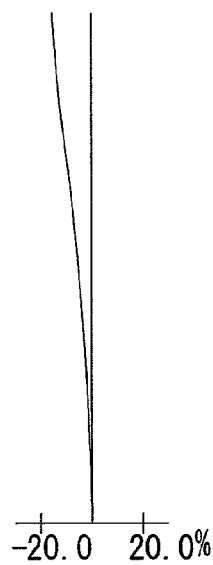
Figure 9A:
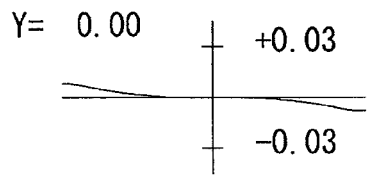
FIGS. 9A, 9B, 9C and 9D show lateral aberrations that occurred in the lens arrangement shown in FIG. 7.
Figure 9B:
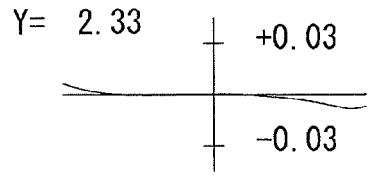
Figure 9C:
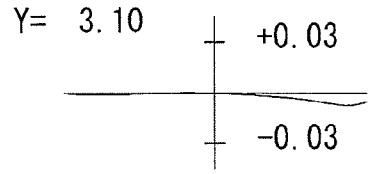
Figure 9D:
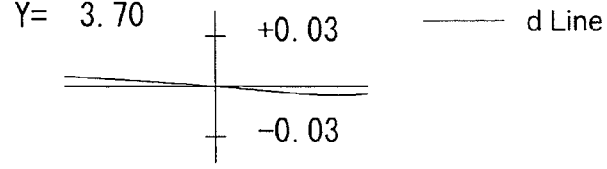

FIGS. 1 through 10D and Tables 1 through 4 show a first numerical embodiment of the high zoom-ratio zoom lens system according to the present invention. FIG. 1 shows a lens arrangement of the first numerical embodiment of the high zoom-ratio zoom lens system at the long focal length extremity when focused on an object at infinity. FIGS. 2A, 2B, 2C and 2D show various aberrations that occurred in the lens arrangement shown in FIG. 1. FIGS. 3A, 3B, 3C and 3D show lateral aberrations that occurred in the lens arrangement shown in FIG. 1. FIG. 4 shows a lens arrangement of the first numerical embodiment at an intermediate focal length when focused on an object at infinity. FIGS. 5A, 5B, 5C and 5D show various aberrations that occurred in the lens arrangement shown in FIG. 4. FIGS. 6A, 6B, 6C and 6D show lateral aberrations that occurred in the lens arrangement shown in FIG. 4. FIG. 7 shows a lens arrangement of the first numerical embodiment at the short focal length extremity when focused on an object at infinity. FIGS. 8A, 8B, 8C and 8D show various aberrations that occurred in the lens arrangement shown in FIG. 7. FIGS. 9A, 9B, 9C and 9D show lateral aberrations that occurred in the lens arrangement shown in FIG. 7. FIGS. 10A, 10B, 10C and 10D show lateral aberrations that occurred in the lens arrangement shown in FIG. 1 upon an image-stabilizing operation being carried out by the amount of movements shown in Table 22. Table 1 shows the lens surface data, Table 2 shows various lens system data, Table 3 shows the aspherical surface data, and Table 4 shows the lens group data.

The high zoom-ratio zoom lens system according to the first numerical embodiment is configured of a positive first lens group G1, a negative second lens group G2, a positive third lens group G3, and a positive fourth lens group G4, in that order from the object side. The fourth lens group G4 constitutes a focusing lens group which is moved along the optical axis during a focusing operation (the fourth lens group G4 is advanced toward the object side when focusing on an object at infinity through to an object at a finite distance).

The first lens group G1 (surface Nos. 1 through 6) is configured of a negative meniscus lens element 11 having a convex surface on the object side, a positive meniscus lens element 12 having a convex surface on the object side, and a positive meniscus lens element 13 having a convex surface on the object side, in that order from the object side.

The second lens group G2 (surface Nos. 7 through 12) is configured of a negative meniscus lens element 21 having a convex surface on the object side, a biconcave negative lens element 22, and a biconvex positive lens element 23, in that order from the object side. The biconvex positive lens element 23 has an aspherical surface on each side thereof.

The third lens group G3 (surface Nos. 14 through 20) is configured of a biconvex positive lens element 31, a cemented lens provided with a biconvex positive lens element 32 and a negative meniscus lens element 33 having a convex surface on the image side; and a negative meniscus lens element 34 having a convex surface on the object side, in that order from the object side. The biconvex positive lens element 31 has an aspherical surface on each side thereof. The diaphragm S (surface No. 13) which is positioned in between the second lens group G2 and the third lens group G3 moves integrally with the third lens group G3 along the optical axis direction.

The fourth lens group G4 (surface Nos. 21 through 24) is configured of a biconvex positive lens element 41 and a negative meniscus lens element 42 having a convex surface on the image side, in that order from the object side. The biconvex positive lens element 41 has an aspherical surface on each side thereof. The negative meniscus lens element 42 has an aspherical surface on the object side thereof. An optical filter OP (surface Nos. 25 and 26) and a cover glass CG (surface Nos. 27 and 28) are provided behind (and in front of the imaging plane I) the fourth lens group G4 (the negative meniscus lens element 42).

TABLE 1

SURFACE DATA

| Surf. No. | r | d | N(d) | vd |
|---|---|---|---|---|
| 1 | 34.605 | 0.900 | 2.00100 | 29.1 |
| 2 | 24.193 | 0.200 | | |
| 3 | 24.577 | 3.300 | 1.43500 | 95.0 |
| 4 | 1738.451 | 0.100 | | |
| 5 | 25.784 | 2.650 | 1.59282 | 68.6 |
| 6 | 173.956 | d6 | | |
| 7 | 98.562 | 0.700 | 1.88300 | 40.8 |
| 8 | 5.650 | 2.600 | | |
| 9 | −18.251 | 0.700 | 1.72916 | 54.7 |
| 10 | 7.819 | 0.100 | | |
| 11* | 7.231 | 1.920 | 1.82115 | 24.1 |
| 12* | −1000.000 | d12 | | |
| 13(Diaphragm) | ∞ | 0.600 | | |
| 14* | 8.257 | 1.280 | 1.59201 | 67.0 |
| 15* | −33.929 | 0.100 | | |
| 16 | 6.125 | 1.600 | 1.48749 | 70.4 |
| 17 | −12.378 | 0.650 | 1.90366 | 31.3 |
| 18 | −26.434 | 0.100 | | |
| 19 | 10.270 | 0.600 | 1.91082 | 35.2 |
| 20 | 4.195 | d20 | | |
| 21* | 12.255 | 2.460 | 1.54358 | 55.7 |
| 22* | −13.877 | 0.100 | | |
| 23* | −13.628 | 0.700 | 1.60641 | 27.2 |
| 24 | −145.412 | d24 | | |
| 25 | ∞ | 0.300 | 1.51680 | 64.2 |
| 26 | ∞ | 0.560 | | |
| 27 | ∞ | 0.500 | 1.51680 | 64.2 |
| 28 | ∞ | — | | |

The asterisk (*) designates an aspherical surface which is rotationally symmetrical with respect to the optical axis.

TABLE 2

ZOOM LENS SYSTEM DATA
Zoom Ratio 18.00

|  | Short Focal Length Extremity | Intermediate Focal Length | Long Focal Length Extremity |
|---|---|---|---|
| FNO. | 3.6 | 5.0 | 6.0 |
| f | 4.50 | 19.00 | 81.00 |
| W | 44.2 | 11.5 | 2.7 |
| Y | 3.70 | 3.88 | 3.88 |
| fB | 0.59 | 0.59 | 0.59 |
| L | 49.00 | 61.93 | 72.63 |
| d6 | 0.400 | 15.124 | 27.439 |
| d12 | 15.920 | 5.014 | 0.997 |
| d20 | 5.563 | 8.308 | 18.858 |
| d24 | 3.807 | 10.171 | 2.024 |

TABLE 3

Aspherical Surface Data (the aspherical surface coefficients not indicated are zero (0.00)):

| Surf. No. | K | A4 | A6 | A8 | A10 |
|---|---|---|---|---|---|
| 11 | 0.000 | −0.7322E−04 | −0.1316E−04 | 0.7020E−06 | −0.1332E−07 |
| 12 | 0.000 | −0.4612E−05 | −0.3441E−05 | 0.3197E−06 |  |
| 14 | −1.000 | −0.1129E−03 | 0.6733E−05 | 0.2654E−06 | −0.1777E−06 |
| 15 | 0.000 | 0.3024E−04 | 0.1825E−04 | −0.2052E−05 |  |
| 21 | 0.000 | −0.1686E−03 | 0.3030E−04 | −0.2347E−05 | 0.5855E−07 |
| 22 | 0.000 | 0.2038E−02 | −0.1498E−03 | 0.1536E−05 | 0.5729E−07 |
| 23 | 0.000 | 0.1995E−02 | −0.1602E−03 | 0.3426E−05 |  |

TABLE 4

LENS GROUP DATA

| Lens Group | 1$^{st}$ Surf. | Focal Length |
|---|---|---|
| 1 | 1 | 40.60 |
| 2 | 7 | −5.99 |
| 3 | 14 | 11.48 |
| 4 | 21 | 22.97 |

Numerical Embodiment 2

Figure 11:
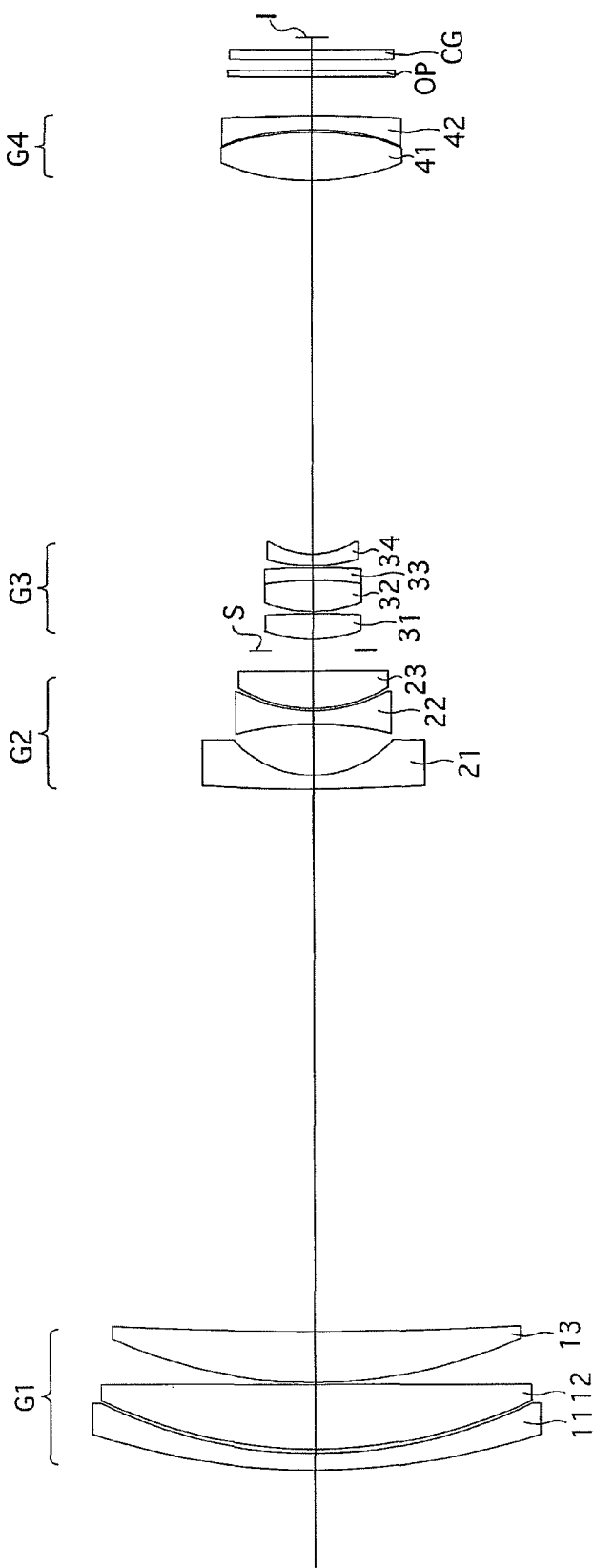
FIG. 11 shows a lens arrangement of a second numerical embodiment of a high zoom-ratio zoom lens system, according to the present invention, at the long focal length extremity when focused on an object at infinity.
Figure 14:
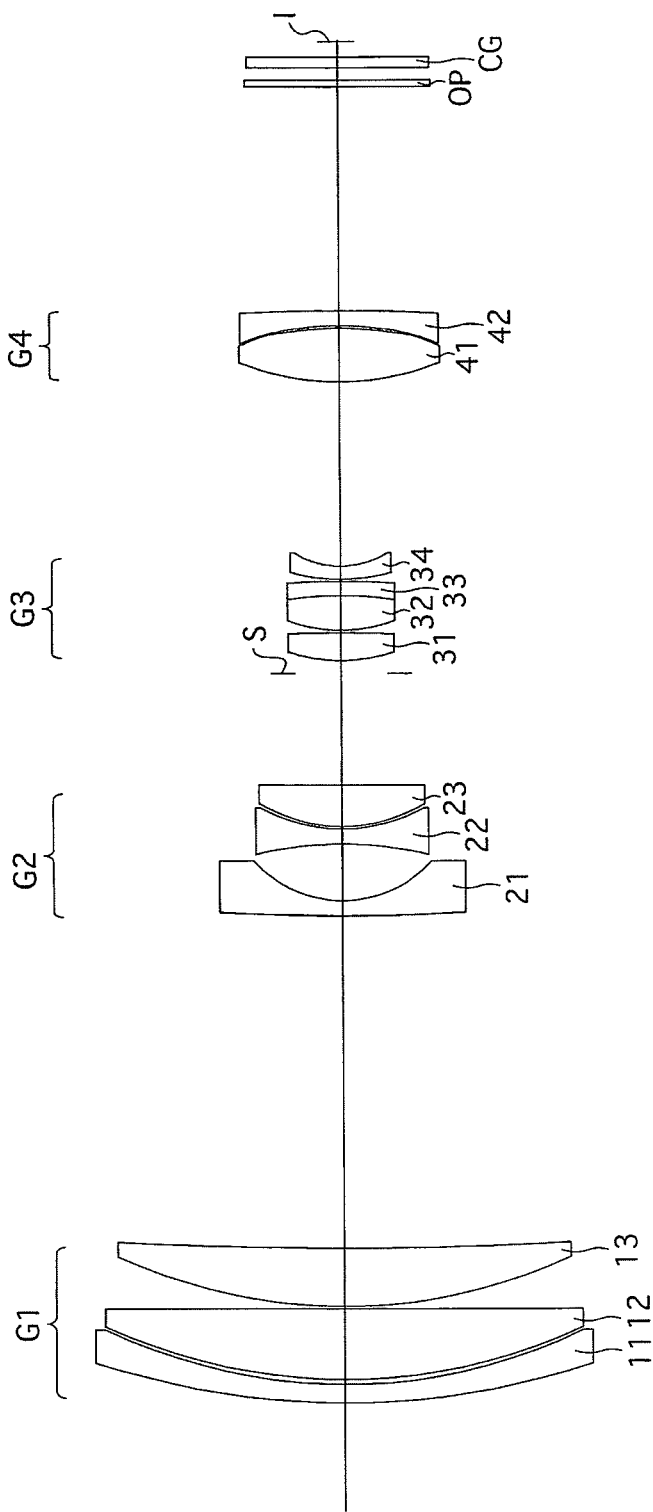
FIG. 14 shows the lens arrangement of the second numerical embodiment at an intermediate focal length when focused on an object at infinity.
Figure 17:
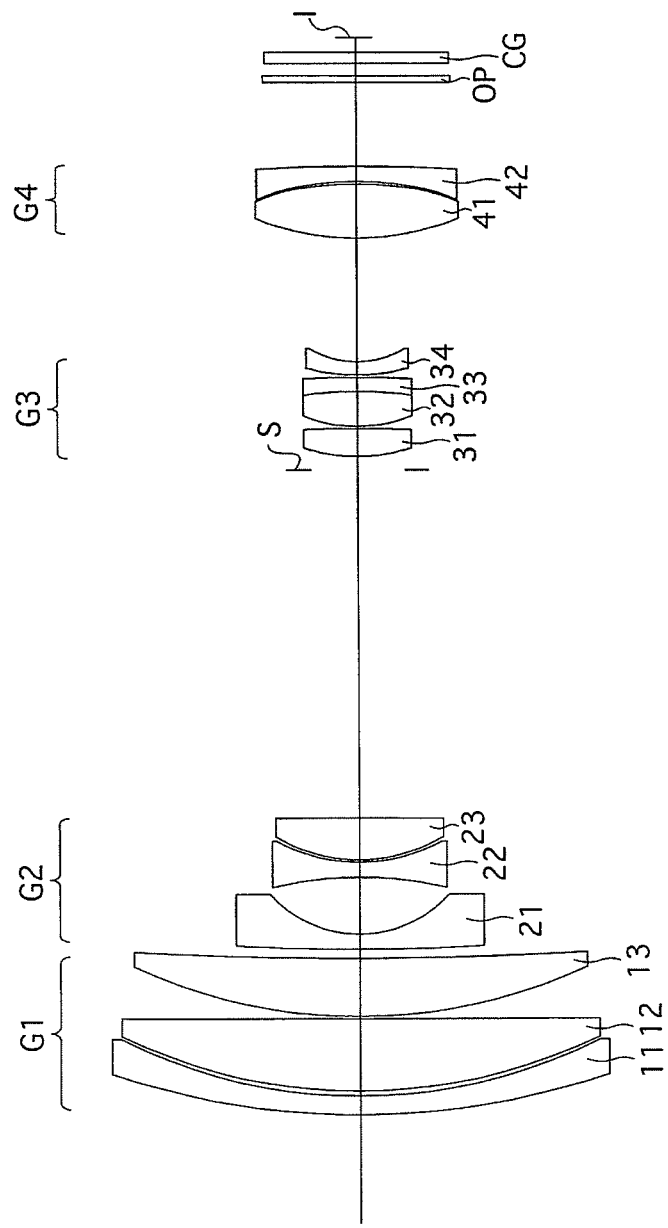
FIG. 17 shows the lens arrangement of the second numerical embodiment at the short focal length extremity when focused on an object at infinity.
Figure 20A:
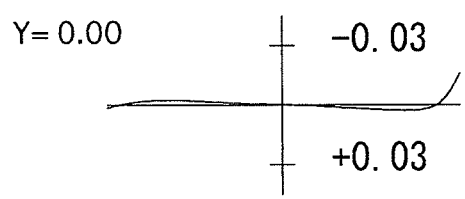
FIGS. 20A, 20B, 20C and 20D show lateral aberrations that occurred in the lens arrangement of the second numerical embodiment upon an image-stabilizing operation being carried out at the long focal length extremity.
Figure 20B:
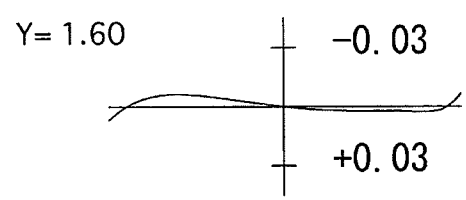
Figure 20C:
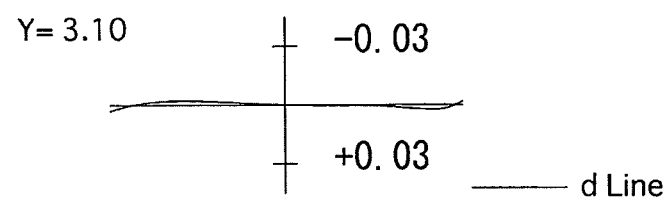
Figure 20D:
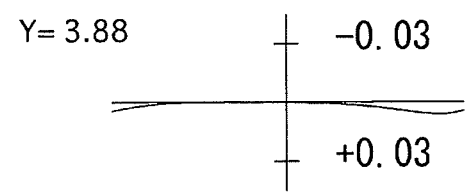

FIGS. 11 through 20D and Tables 5 through 8 show a second numerical embodiment of the high zoom-ratio zoom lens system according to the present invention. FIG. 11 shows a lens arrangement of the second numerical embodiment of the high zoom-ratio zoom lens system at the long focal length extremity when focused on an object at infinity. FIGS. 12A, 12B, 12C and 12D show various aberrations that occurred in the lens arrangement shown in FIG. 11. FIGS. 13A, 13B, 13C and 13D show lateral aberrations that occurred in the lens arrangement shown in FIG. 11. FIG. 14 shows the lens arrangement of the second numerical embodiment at an intermediate focal length when focused on an object at infinity. FIGS. 15A, 15B, 15C and 15D show various aberrations that occurred in the lens arrangement shown in FIG. 14. FIGS. 16A, 16B, 16C and 16D show lateral aberrations that occurred in the lens arrangement shown in FIG. 14. FIG. 17 shows the lens arrangement of the second numerical embodiment at the short focal length extremity when focused on an object at infinity. FIGS. 18A, 18B, 18C and 18D show various aberrations that occurred in the lens arrangement shown in FIG. 17. FIGS. 19A, 19B, 19C and 19D show lateral aberrations that occurred in the lens arrangement shown in FIG. 17. FIGS. 20A, 20B, 20C and 20D show lateral aberrations that occurred in the lens arrangement shown in FIG. 11 upon an image-stabilizing operation being carried out by the amount of movements shown in Table 22. Table 5 shows the lens surface data, Table 6 shows various lens system data, Table 7 shows the aspherical surface data, and Table 8 shows the lens group data.

The lens arrangement of the second numerical embodiment is the same as that of the first numerical embodiment except for the positive lens element 12 of the first lens group G1 being a biconvex positive lens element.

TABLE 5

SURFACE DATA

| Surf. No. | r | d | N(d) | νd |
|---|---|---|---|---|
| 1 | 36.718 | 0.850 | 2.00100 | 29.1 |
| 2 | 25.114 | 0.229 |  |  |
| 3 | 25.925 | 3.300 | 1.43500 | 95.0 |
| 4 | −6882.285 | 0.100 |  |  |
| 5 | 25.493 | 2.650 | 1.59282 | 68.6 |
| 6 | 199.262 | d6 |  |  |
| 7 | 97.320 | 0.700 | 1.83481 | 42.7 |
| 8 | 5.594 | 2.600 |  |  |
| 9 | −17.397 | 0.700 | 1.75500 | 52.3 |
| 10 | 8.036 | 0.100 |  |  |
| 11* | 7.275 | 1.920 | 1.82115 | 24.1 |
| 12* | −1000.000 | d12 |  |  |
| 13(Diaphragm) | ∞ | 0.600 |  |  |
| 14* | 7.742 | 1.280 | 1.59201 | 67.0 |
| 15* | −49.584 | 0.100 |  |  |
| 16 | 6.842 | 1.600 | 1.49700 | 81.6 |
| 17 | −16.810 | 0.650 | 1.90366 | 31.3 |
| 18 | −40.539 | 0.100 |  |  |
| 19 | 8.943 | 0.600 | 1.91082 | 35.2 |
| 20 | 4.195 | d20 |  |  |
| 21* | 12.526 | 2.460 | 1.54358 | 55.7 |
| 22* | −13.493 | 0.100 |  |  |
| 23* | −12.518 | 0.700 | 1.60641 | 27.2 |
| 24 | −81.176 | d24 |  |  |
| 25 | ∞ | 0.300 | 1.51680 | 64.2 |
| 26 | ∞ | 0.560 |  |  |
| 27 | ∞ | 0.500 | 1.51680 | 64.2 |
| 28 | ∞ | — |  |  |

The asterisk (*) designates an aspherical surface which is rotationally symmetrical with respect to the optical axis.

TABLE 6

ZOOM LENS SYSTEM DATA
Zoom Ratio 18.00

| | Short Focal Length Extremity | Intermediate Focal Length | Long Focal Length Extremity |
|---|---|---|---|
| FN0. | 3.6 | 5.0 | 6.0 |
| f | 4.50 | 19.00 | 81.00 |
| W | 44.2 | 11.5 | 2.9 |
| Y | 3.70 | 3.88 | 3.88 |
| fB | 0.59 | 0.59 | 0.59 |
| L | 49.13 | 62.21 | 72.89 |
| d6 | 0.400 | 15.220 | 27.605 |
| d12 | 15.965 | 5.066 | 1.051 |
| d20 | 5.652 | 8.434 | 18.949 |
| d24 | 3.827 | 10.200 | 2.001 |

TABLE 7

Aspherical Surface Data (the aspherical surface coefficients not indicated are zero (0.00)):

| Surf. No. | K | A4 | A6 | A8 | A10 |
|---|---|---|---|---|---|
| 11 | 0.000 | −0.1256E−03 | −0.1086E−04 | 0.6229E−06 | −0.1204E−07 |
| 12 | 0.000 | −0.2530E−04 | −0.1826E−05 | 0.3070E−06 | |
| 14 | −1.000 | −0.9410E−04 | 0.1106E−04 | −0.1277E−05 | −0.1310E−06 |
| 15 | 0.000 | 0.1956E−04 | 0.1987E−04 | −0.3049E−05 | |
| 21 | 0.000 | −0.1644E−03 | 0.2742E−04 | −0.2153E−05 | 0.5474E−07 |
| 22 | 0.000 | 0.1804E−02 | −0.1278E−03 | 0.8715E−06 | 0.5781E−07 |
| 23 | 0.000 | 0.1804E−02 | −0.1386E−03 | 0.2779E−05 | |

TABLE 8

LENS GROUP DATA

| Lens Group | 1st Surf. | Focal Length |
|---|---|---|
| 1 | 1 | 40.69 |
| 2 | 7 | −5.99 |
| 3 | 14 | 11.48 |
| 4 | 21 | 23.27 |

Numerical Embodiment 3

Figure 21:
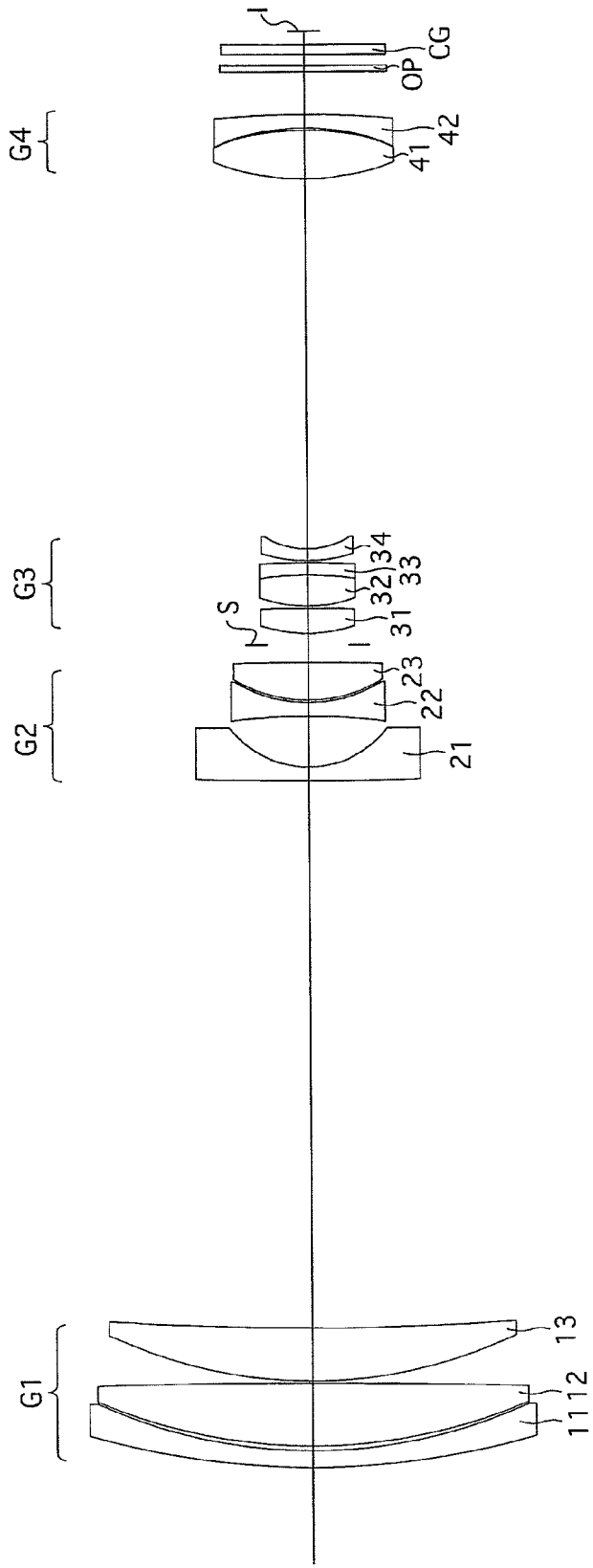
FIG. 21 shows a lens arrangement of a third numerical embodiment of a high zoom-ratio zoom lens system, according to the present invention, at the long focal length extremity when focused on an object at infinity.
Figure 24:
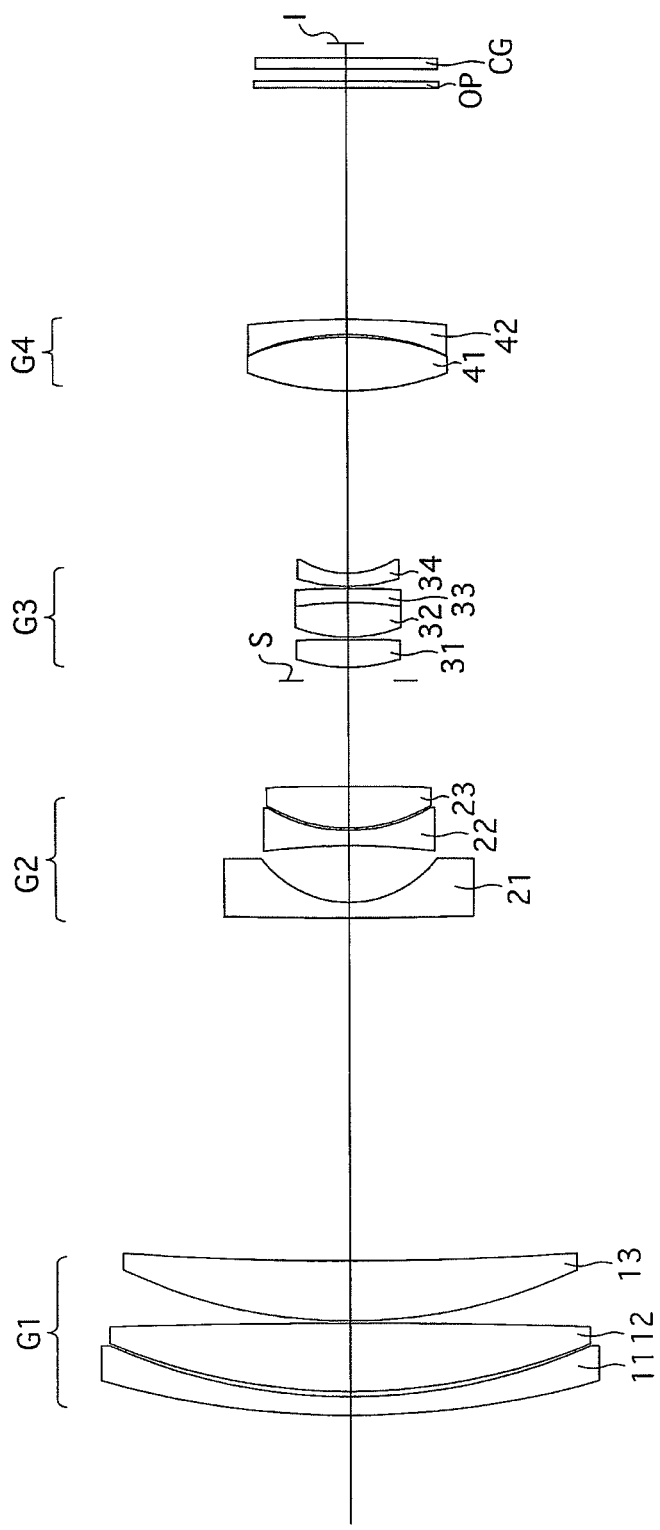
FIG. 24 shows the lens arrangement of the third numerical embodiment at an intermediate focal length when focused on an object at infinity.
Figure 27:
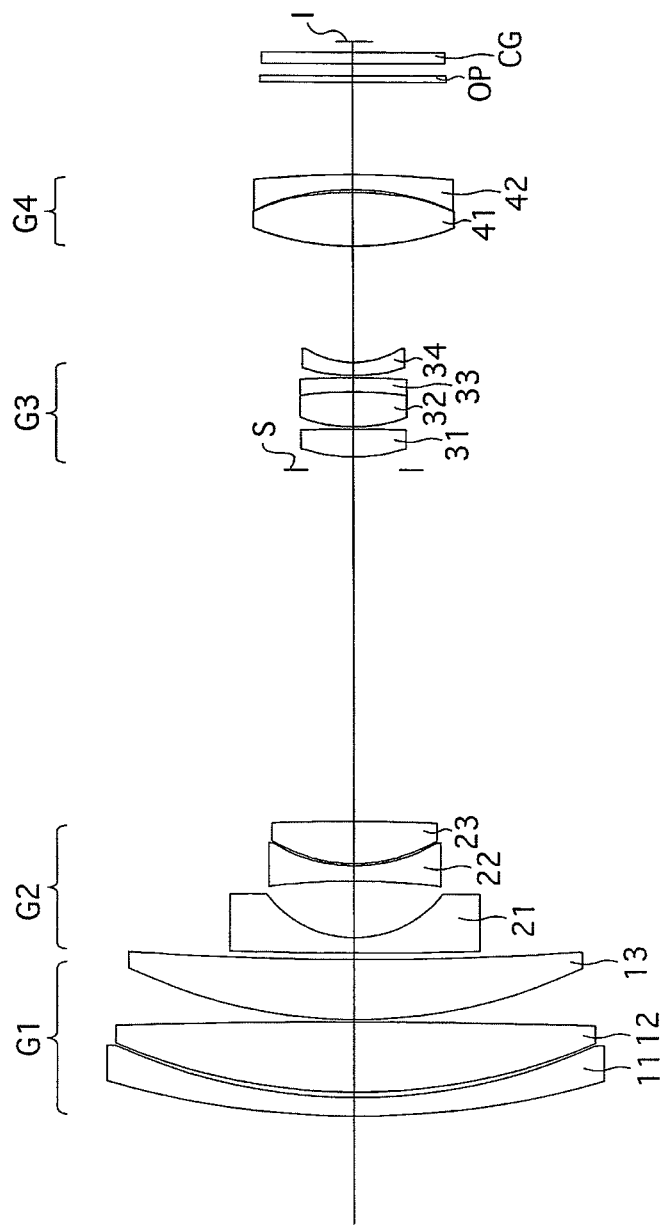
FIG. 27 shows the lens arrangement of the third numerical embodiment at the short focal length extremity when focused on an object at infinity.
Figure 30A:
FIGS. 30A, 30B, 30C and 30D show lateral aberrations that occurred in the lens arrangement of the third numerical embodiment upon an image-stabilizing operation being carried out at the long focal length extremity.
Figure 30B:
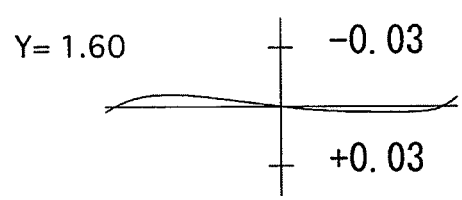
Figure 30C:
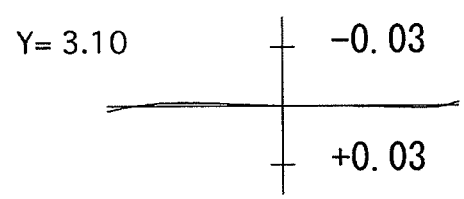
Figure 30D:
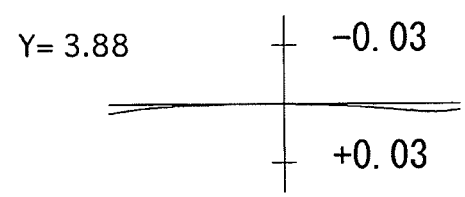

FIGS. 21 through 30D and Tables 9 through 12 show a third numerical embodiment of the high zoom-ratio zoom lens system according to the present invention. FIG. 21 shows a lens arrangement of the third numerical embodiment of the high zoom-ratio zoom lens system at the long focal length extremity when focused on an object at infinity. FIGS. 22A, 22B, 22C and 22D show various aberrations that occurred in the lens arrangement shown in FIG. 21. FIGS. 23A, 23B, 23C and 23D show lateral aberrations that occurred in the lens arrangement shown in FIG. 21. FIG. 24 shows the lens arrangement of the third numerical embodiment at an intermediate focal length when focused on an object at infinity. FIGS. 25A, 25B, 25C and 25D show various aberrations that occurred in the lens arrangement shown in FIG. 24. FIGS. 26A, 26B, 26C and 26D show lateral aberrations that occurred in the lens arrangement shown in FIG. 24. FIG. 27 shows the lens arrangement of the third numerical embodiment at the short focal length extremity when focused on an object at infinity. FIGS. 28A, 28B, 28C and 28D show various aberrations that occurred in the lens arrangement shown in FIG. 27. FIGS. 29A, 29B, 29C and 29D show lateral aberrations that occurred in the lens arrangement shown in FIG. 27. FIGS. 30A, 30B, 30C and 30D show lateral aberrations that occurred in the lens arrangement shown in FIG. 21 upon an image-stabilizing operation being carried out by the amount of movements shown in Table 22. Table 9 shows the lens surface data, Table 10 shows various lens system data, Table 11 shows the aspherical surface data, and Table 12 shows the lens group data.

The lens arrangement of the third numerical embodiment is the same as that of the second numerical embodiment.

TABLE 9

SURFACE DATA

| Surf. No. | r | d | N (d) | vd |
|---|---|---|---|---|
| 1 | 41.562 | 0.850 | 2.00100 | 29.1 |
| 2 | 27.073 | 0.250 | | |
| 3 | 28.703 | 3.200 | 1.45860 | 90.2 |

TABLE 9-continued

SURFACE DATA

| Surf. No. | r | d | N (d) | vd |
|---|---|---|---|---|
| 4 | −397.212 | 0.100 | | |
| 5 | 24.461 | 2.750 | 1.59282 | 68.6 |
| 6 | 152.531 | d6 | | |
| 7 | 192.680 | 0.700 | 1.83481 | 42.7 |
| 8 | 5.175 | 2.600 | | |
| 9 | −32.628 | 0.700 | 1.75500 | 52.3 |
| 10 | 7.453 | 0.100 | | |
| 11* | 7.353 | 1.920 | 1.82115 | 24.1 |
| 12* | −1000.000 | d12 | | |
| 13 (Diaphragm) | ∞ | 0.600 | | |
| 14* | 7.563 | 1.280 | 1.55332 | 71.7 |
| 15* | −56.223 | 0.100 | | |
| 16 | 6.985 | 1.600 | 1.48749 | 70.4 |
| 17 | −17.726 | 0.650 | 2.00069 | 25.5 |
| 18 | −39.420 | 0.100 | | |
| 19 | 7.924 | 0.600 | 1.91082 | 35.2 |
| 20 | 4.195 | d20 | | |
| 21* | 13.290 | 2.460 | 1.54358 | 55.7 |
| 22* | −12.965 | 0.100 | | |
| 23* | −11.488 | 0.700 | 1.60641 | 27.2 |
| 24 | −46.280 | d24 | | |
| 25 | ∞ | 0.300 | 1.51680 | 64.2 |
| 26 | ∞ | 0.560 | | |
| 27 | ∞ | 0.500 | 1.51680 | 64.2 |
| 28 | ∞ | — | | |

The asterisk (*) designates an aspherical surface which is rotationally symmetrical with respect to the optical axis.

TABLE 10

ZOOM LENS SYSTEM DATA
Zoom Ratio 18.84

|  | Short Focal Length Extremity | Intermediate Focal Length | Long Focal Length Extremity |
|---|---|---|---|
| FNO. | 3.6 | 5.1 | 6.0 |
| f | 4.30 | 19.00 | 81.00 |
| W | 45.5 | 11.5 | 2.9 |
| Y | 3.70 | 3.88 | 3.88 |
| fB | 0.59 | 0.59 | 0.59 |
| L | 49.24 | 62.73 | 73.00 |
| d6 | 0.300 | 15.673 | 27.842 |
| d12 | 16.091 | 4.829 | 0.900 |
| d20 | 5.322 | 8.344 | 18.769 |
| d24 | 4.218 | 10.574 | 2.180 |

TABLE 11

Aspherical Surface Data (the aspherical surface coefficients not indicated are zero (0.00)):

| Surf. No. | K | A4 | A6 | A8 | A10 |
|---|---|---|---|---|---|
| 11 | 0.000 | −0.4412E−04 | −0.3369E−05 | −0.1196E−06 | −0.2525E−08 |
| 12 | 0.000 | −0.1891E−03 | −0.1545E−05 | −0.2660E−06 |  |
| 14 | −1.000 | −0.6681E−04 | 0.1573E−04 | −0.2463E−05 | −0.8772E−07 |
| 15 | 0.000 | 0.1404E−04 | 0.2323E−04 | −0.3687E−05 |  |
| 21 | 0.000 | −0.1759E−03 | 0.3094E−04 | −0.2478E−05 | 0.6587E−07 |
| 22 | 0.000 | 0.9488E−03 | −0.5478E−04 | −0.1253E−05 | 0.7190E−07 |
| 23 | 0.000 | 0.1048E−02 | −0.7612E−04 | 0.1250E−05 |  |

TABLE 12

LENS GROUP DATA

| Lens Group | 1$^{st}$ Surf. | Focal Length |
|---|---|---|
| 1 | 1 | 40.44 |
| 2 | 7 | −5.93 |
| 3 | 14 | 11.67 |
| 4 | 21 | 23.18 |

Numerical Embodiment 4

Figure 31:
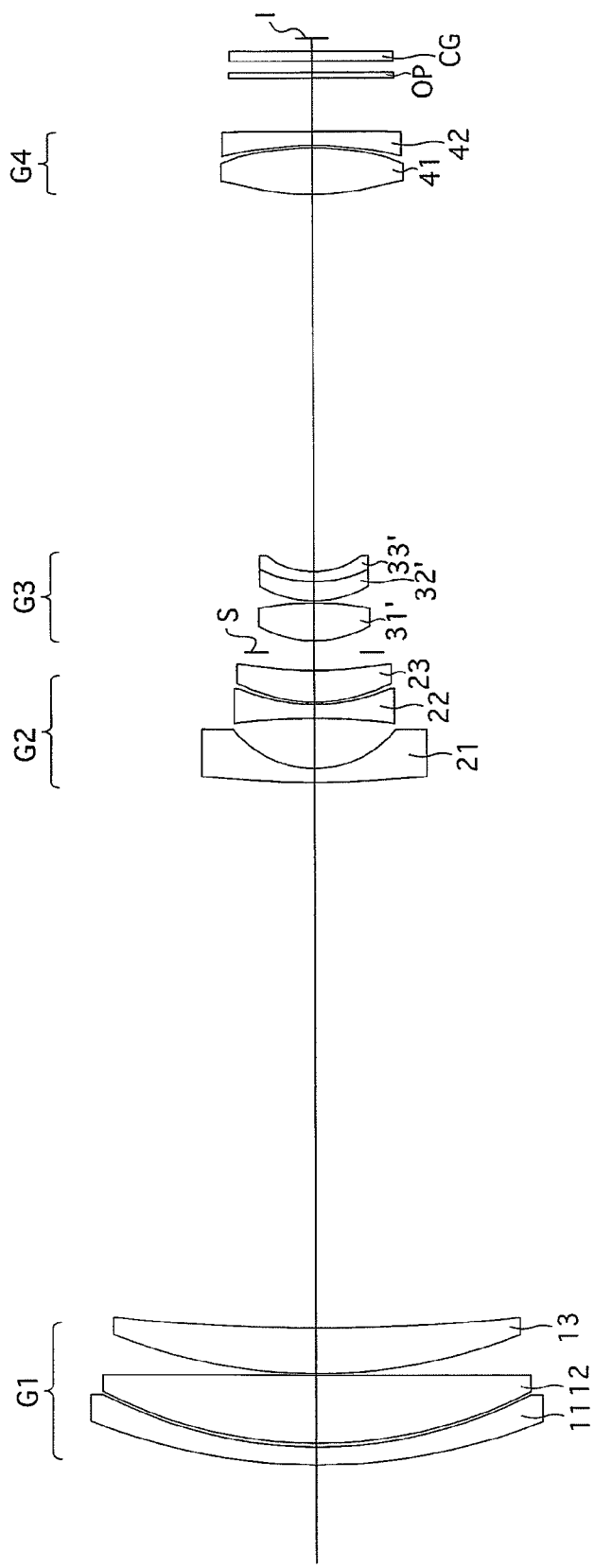
FIG. 31 shows a lens arrangement of a fourth numerical embodiment of a high zoom-ratio zoom lens system, according to the present invention, at the long focal length extremity when focused on an object at infinity.
Figure 34:
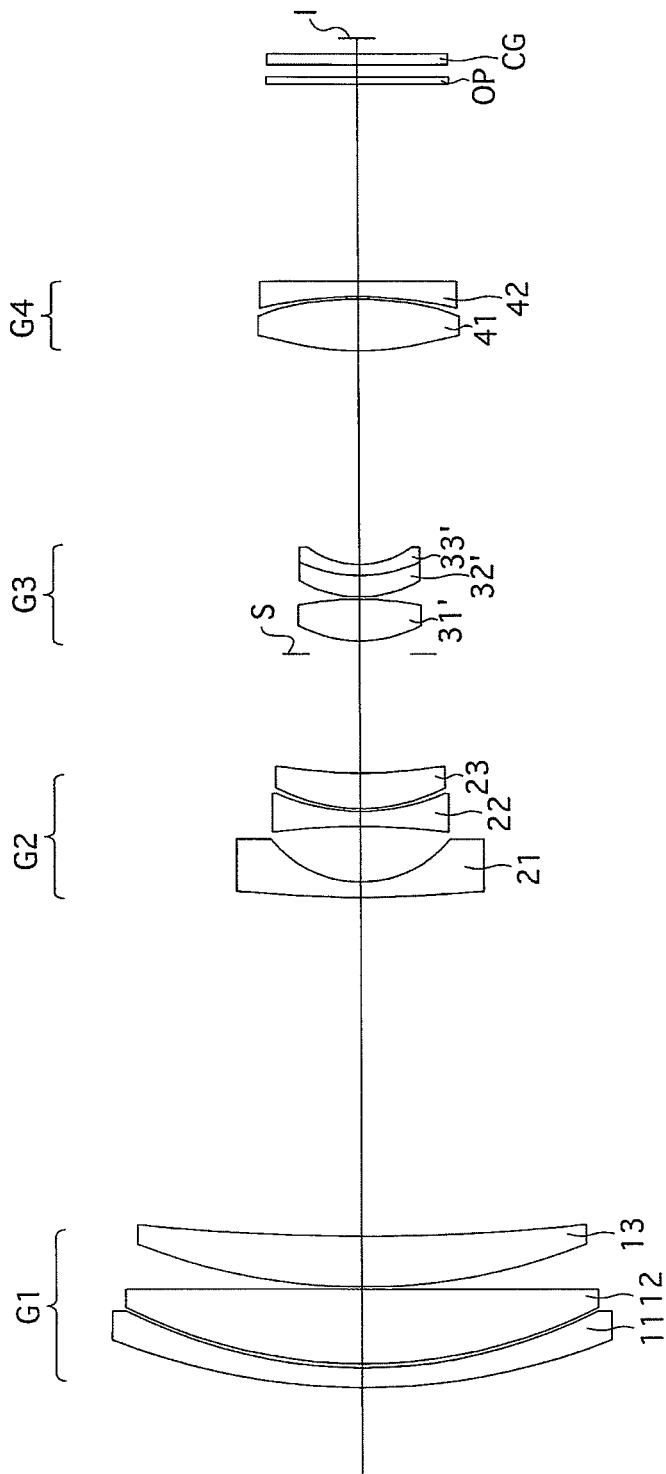
FIG. 34 shows the lens arrangement of the fourth numerical embodiment at an intermediate focal length when focused on an object at infinity.
Figure 37:
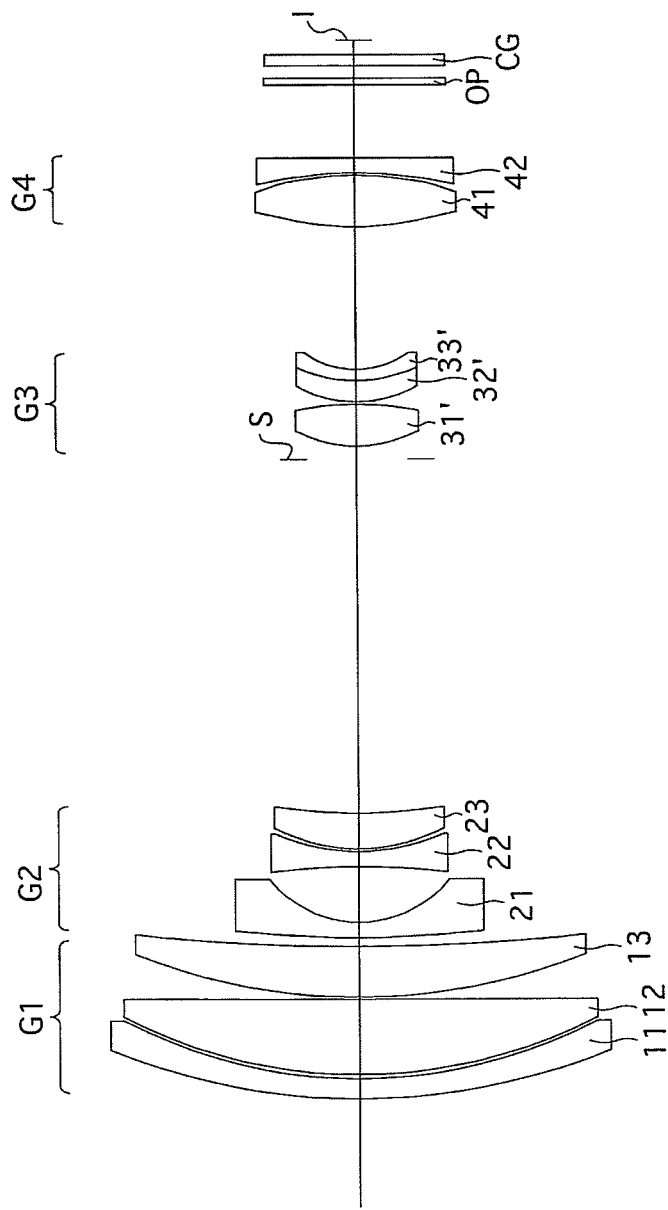
FIG. 37 shows the lens arrangement of the fourth numerical embodiment at the short focal length extremity when focused on an object at infinity.
Figures 38A, 38B, 38C, 38D:
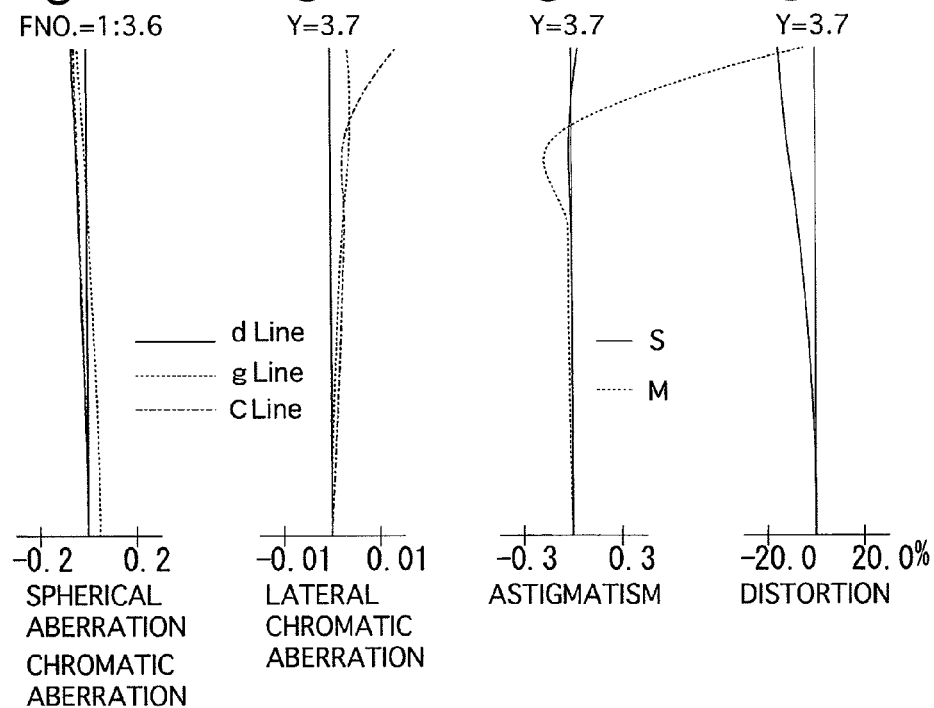
FIGS. 38A, 38B, 38C and 38D show various aberrations that occurred in the lens arrangement shown in FIG. 37.
Figure 39A:
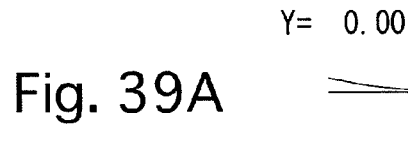
FIGS. 39A, 39B, 39C and 39D show lateral aberrations that occurred in the lens arrangement shown in FIG. 37.
Figure 39B:
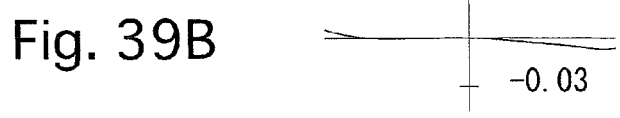
Figure 39C:
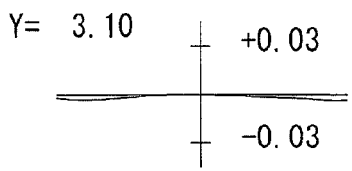
Figure 39D:
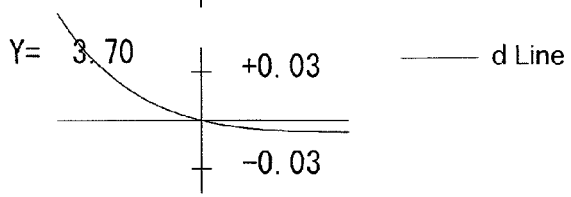

FIGS. 31 through 40D and Tables 13 through 16 show a fourth numerical embodiment of the high zoom-ratio zoom lens system according to the present invention. FIG. 31 shows a lens arrangement of the fourth numerical embodiment of the high zoom-ratio zoom lens system at the long focal length extremity when focused on an object at infinity. FIGS. 32A, 32B, 32C and 32D show various aberrations that occurred in the lens arrangement shown in FIG. 31. FIGS. 33A, 33B, 33C and 33D show lateral aberrations that occurred in the lens arrangement shown in FIG. 31. FIG. 34 shows the lens arrangement of the fourth numerical embodiment at an intermediate focal length when focused on an object at infinity. FIGS. 35A, 35B, 35C and 35D show various aberrations that occurred in the lens arrangement shown in FIG. 34. FIGS. 36A, 36B, 36C and 36D show lateral aberrations that occurred in the lens arrangement shown in FIG. 34. FIG. 37 shows the lens arrangement of the fourth numerical embodiment at the short focal length extremity when focused on an object at infinity. FIGS. 38A, 38B, 38C and 38D show various aberrations that occurred in the lens arrangement shown in FIG. 37. FIGS. 39A, 39B, 39C and 39D show lateral aberrations that occurred in the lens arrangement shown in FIG. 37. FIGS. 40A, 40B, 40C and 40D show lateral aberrations that occurred in the lens arrangement shown in FIG. 31 upon an image-stabilizing operation being carried out by the amount of movements shown in Table 22. Table 13 shows the lens surface data, Table 14 shows various lens system data, Table 15 shows the aspherical surface data, and Table 16 shows the lens group data.

The lens arrangement of the fourth numerical embodiment is the same as those of the second and third numerical embodiments except for the following points:

(1) The negative lens element 21 of the second lens group G2 has an aspherical surface on the object side thereof.

(2) The positive lens element 23 of the second lens group G2 is a positive meniscus lens element having a convex surface on the object side.

(3) The third lens group G3 is configured of a biconvex positive lens element 31', and a cemented lens provided with a positive meniscus lens element 32' having a convex surface on the object side and a negative meniscus lens element 33' having a convex surface on the object side, in that order from the object side. The biconvex positive lens element 31' has an aspherical surface on each side thereof.

TABLE 13

SURFACE DATA

| Surf. No. | r | d | N (d) | vd |
|---|---|---|---|---|
| 1 | 31.385 | 0.900 | 2.00069 | 25.5 |
| 2 | 23.914 | 0.193 |  |  |
| 3 | 24.169 | 3.449 | 1.45860 | 90.2 |
| 4 | −5256.652 | 0.100 |  |  |
| 5 | 28.770 | 2.315 | 1.59282 | 68.6 |
| 6 | 100.708 | d6 |  |  |
| 7* | 49.725 | 0.700 | 1.85135 | 40.1 |
| 8 | 5.397 | 2.544 |  |  |
| 9 | −33.259 | 0.700 | 1.72916 | 54.7 |
| 10 | 9.886 | 0.100 |  |  |
| 11* | 7.759 | 1.631 | 2.00272 | 19.3 |
| 12* | 19.234 | d12 |  |  |
| 13 (Diaphragm) | ∞ | 0.600 |  |  |
| 14* | 5.603 | 1.929 | 1.49700 | 81.6 |
| 15* | −13.345 | 0.100 |  |  |
| 16 | 5.649 | 0.984 | 1.51680 | 64.2 |
| 17 | 6.760 | 0.500 | 2.00069 | 25.5 |
| 18 | 4.108 | d18 |  |  |
| 19* | 13.643 | 2.365 | 1.54358 | 55.7 |
| 20* | −11.421 | 0.100 |  |  |
| 21* | −13.735 | 0.700 | 1.60641 | 27.2 |
| 22 | −751.067 | d22 |  |  |
| 23 | ∞ | 0.300 | 1.51680 | 64.2 |
| 24 | ∞ | 0.560 |  |  |
| 25 | ∞ | 0.500 | 1.51680 | 64.2 |
| 26 | ∞ | — |  |  |

The asterisk (*) designates an aspherical surface which is rotationally symmetrical with respect to the optical axis.

TABLE 14

ZOOM LENS SYSTEM DATA
Zoom Ratio 17.79

|  | Short Focal Length Extremity | Intermediate Focal Length | Long Focal Length Extremity |
|---|---|---|---|
| FNO. | 3.6 | 5.0 | 6.0 |
| f | 4.55 | 19.00 | 81.01 |
| W | 43.8 | 11.4 | 2.9 |
| Y | 3.70 | 3.88 | 3.88 |
| fB | 0.59 | 0.59 | 0.59 |
| L | 48.30 | 61.60 | 72.05 |
| d6 | 0.406 | 15.463 | 27.615 |
| d12 | 16.172 | 5.461 | 0.900 |
| d18 | 6.521 | 9.821 | 18.997 |
| d22 | 3.343 | 8.994 | 2.675 |

TABLE 15

Aspherical Surface Data (the aspherical surface coefficients not indicated are zero (0.00)):

| Surf. No. | K | A4 | A6 | A8 | A10 |
|---|---|---|---|---|---|
| 7  | 0.000  | 0.5852E−04  | −0.4608E−05 | 0.4828E−07  |  |
| 11 | 0.000  | −0.3453E−03 | −0.3329E−04 | 0.2480E−05  | −0.3847E−07 |
| 12 | 0.000  | −0.2434E−03 | −0.3781E−04 | 0.3120E−05  | −0.5900E−07 |
| 14 | −1.000 | −0.3328E−04 | −0.6212E−05 | 0.4129E−05  | −0.3858E−06 |
| 15 | 0.000  | 0.2419E−03  | 0.2412E−04  | −0.1614E−05 |  |
| 19 | 0.000  | −0.2825E−03 | 0.4947E−04  | −0.4111E−05 | 0.8523E−07 |
| 20 | 0.000  | 0.2756E−02  | −0.1762E−03 | 0.1763E−05  | 0.6352E−07 |
| 21 | 0.000  | 0.2669E−02  | −0.1955E−03 | 0.4627E−05  |  |

TABLE 16

LENS GROUP DATA

| Lens Group | 1st Surf. | Focal Length |
|---|---|---|
| 1 | 1 | 41.83 |
| 2 | 7 | −6.02 |
| 3 | 14 | 11.19 |
| 4 | 19 | 22.63 |

Numerical Embodiment 5

Figure 41:
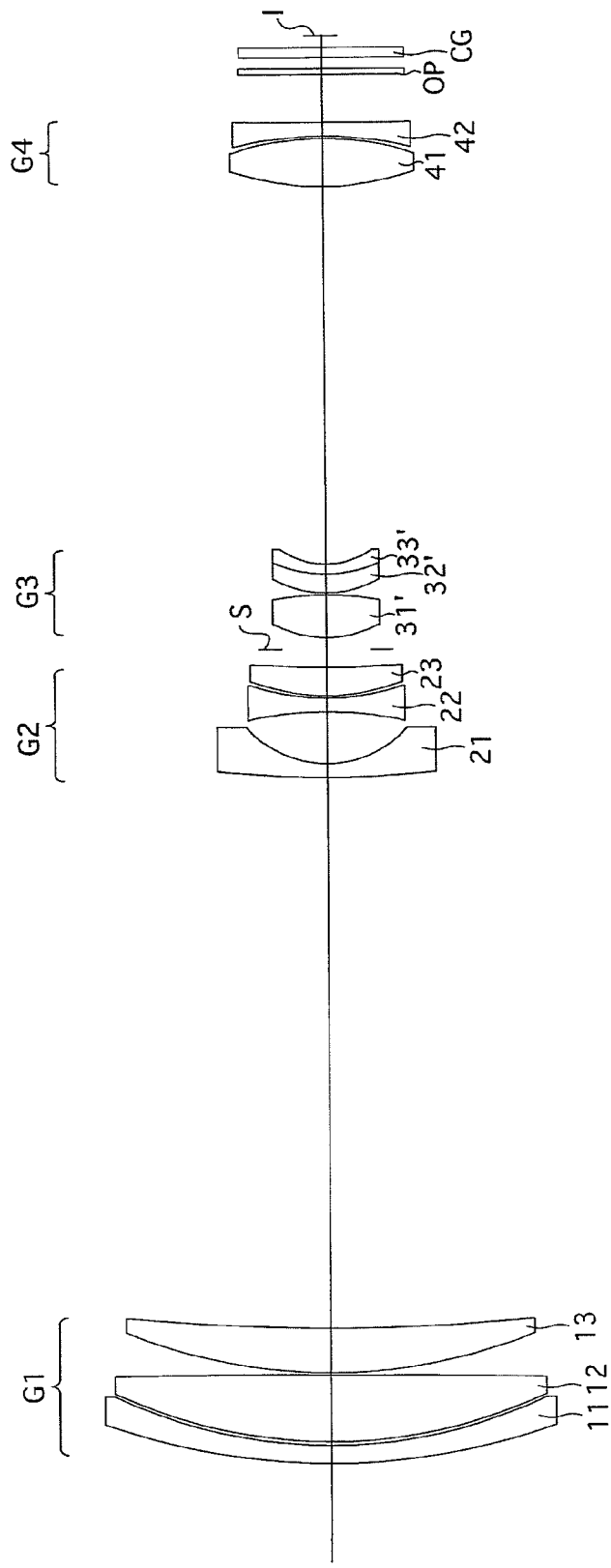
FIG. 41 shows a lens arrangement of a fifth numerical embodiment of a high zoom-ratio zoom lens system, according to the present invention, at the long focal length extremity when focused on an object at infinity.
Figure 44:
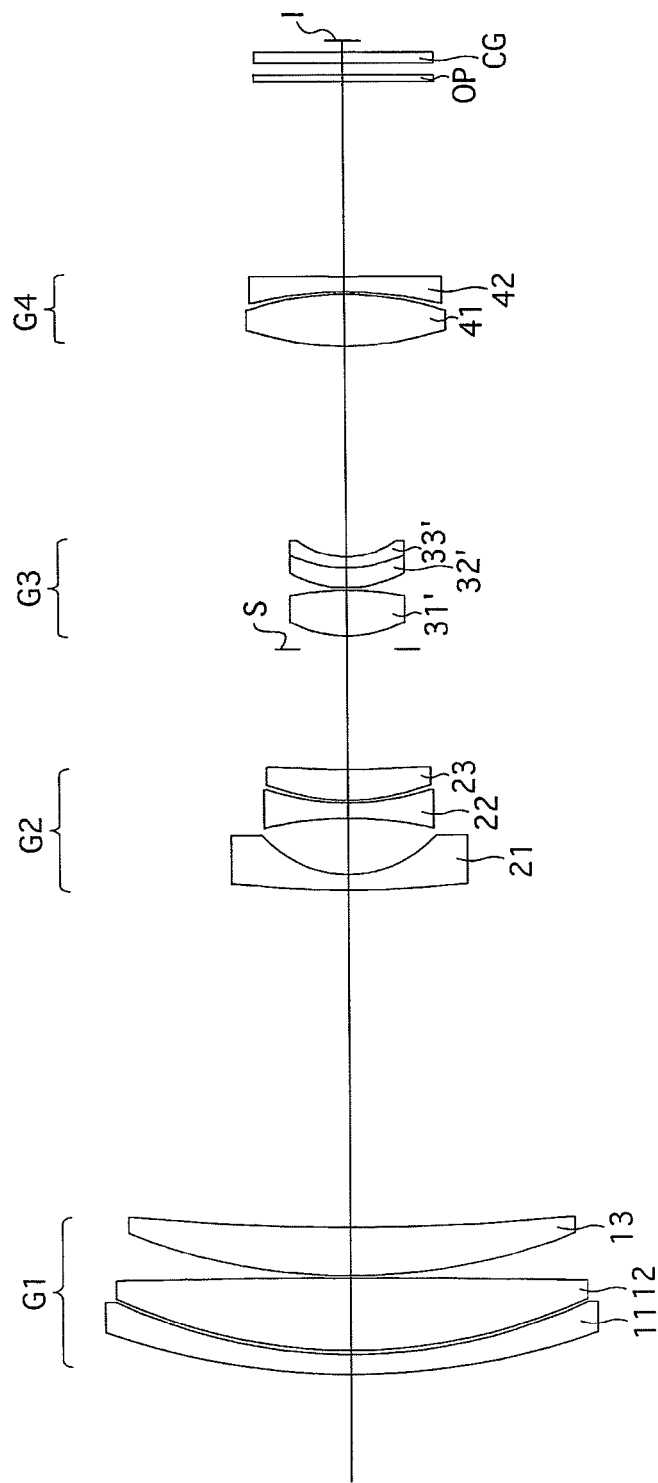
FIG. 44 shows the lens arrangement of the fifth numerical embodiment at an intermediate focal length when focused on an object at infinity.
Figure 47:
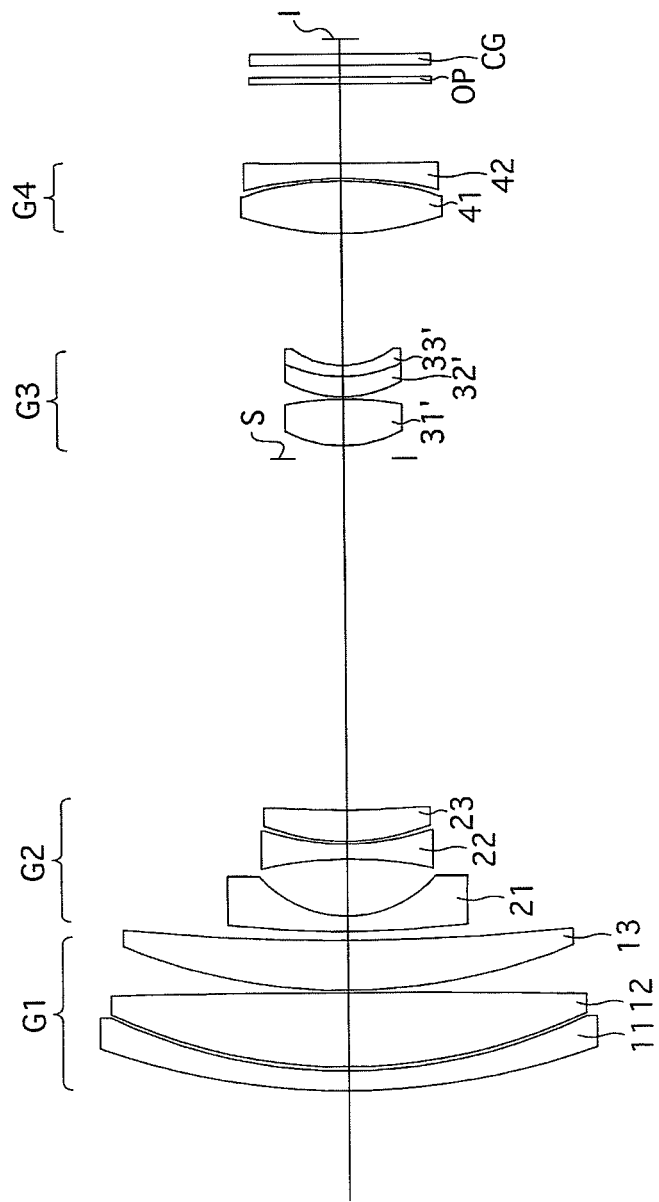
FIG. 47 shows the lens arrangement of the fifth numerical embodiment at the short focal length extremity when focused on an object at infinity.
Figure 50A:
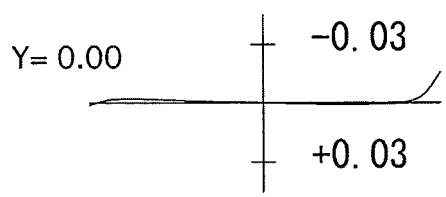
FIGS. 50A, 50B, 50C and 50D show lateral aberrations that occurred in the lens arrangement of the fifth numerical embodiment upon an image-stabilizing operation being carried out at the long focal length extremity.
Figure 50B:
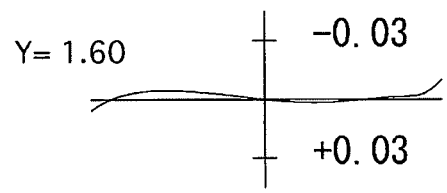
Figure 50C:
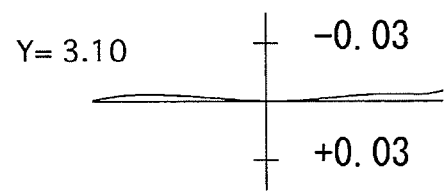
Figure 50D:
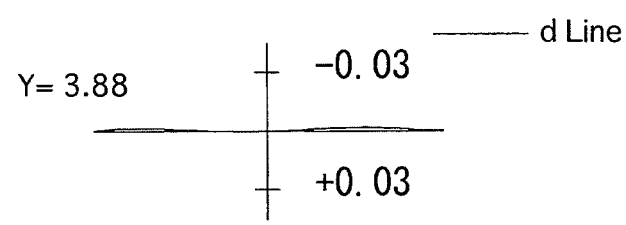

FIGS. 41 through 50D and Tables 17 through 20 show a fifth numerical embodiment of the high zoom-ratio zoom lens system according to the present invention. FIG. 41 shows a lens arrangement of the fifth numerical embodiment of the high zoom-ratio zoom lens system at the long focal length extremity when focused on an object at infinity. FIGS. 42A, 42B, 42C and 42D show various aberrations that occurred in the lens arrangement shown in FIG. 41. FIGS. 43A, 43B, 43C and 43D show lateral aberrations that occurred in the lens arrangement shown in FIG. 41. FIG. 44 shows the lens arrangement of the fifth numerical embodiment at an intermediate focal length when focused on an object at infinity. FIGS. 45A, 45B, 45C and 45D show various aberrations that occurred in the lens arrangement shown in FIG. 44. FIGS. 46A, 46B, 46C and 46D show lateral aberrations that occurred in the lens arrangement shown in FIG. 44. FIG. 47 shows the lens arrangement of the fifth numerical embodiment at the short focal length extremity when focused on an object at infinity. FIGS. 48A, 48B, 48C and 48D show various aberrations that occurred in the lens arrangement shown in FIG. 47. FIGS. 49A, 49B, 49C and 49D show lateral aberrations that occurred in the lens arrangement shown in FIG. 47. FIGS. 50A, 50B, 50C and 50D show lateral aberrations that occurred in the lens arrangement shown in FIG. 41 upon an image-stabilizing operation being carried out by the amount of movements shown in Table 22. Table 17 shows the lens surface data, Table 18 shows various lens system data, Table 19 shows the aspherical surface data, and Table 20 shows the lens group data.

The lens arrangement of the fifth numerical embodiment is the same as that of the fourth numerical embodiment except that the negative lens element 42 of the fourth lens group G4 is a biconcave negative lens element.

TABLE 17

SURFACE DATA

| Surf. No. | r | d | N (d) | νd |
|---|---|---|---|---|
| 1 | 34.694 | 0.900 | 2.00069 | 25.5 |
| 2 | 25.793 | 0.190 |  |  |
| 3 | 26.182 | 3.385 | 1.45860 | 90.2 |
| 4 | −497.744 | 0.100 |  |  |
| 5 | 27.942 | 2.258 | 1.59282 | 68.6 |
| 6 | 104.780 | d6 |  |  |
| 7* | 46.389 | 0.700 | 1.85135 | 40.1 |
| 8 | 5.509 | 2.609 |  |  |
| 9 | −18.124 | 0.700 | 1.75500 | 52.3 |
| 10 | 12.195 | 0.100 |  |  |
| 11* | 9.172 | 1.447 | 2.00272 | 19.3 |
| 12* | 34.882 | d12 |  |  |
| 13 (Diaphragm) | ∞ | 0.600 |  |  |
| 14* | 5.498 | 2.130 | 1.49700 | 81.6 |
| 15* | −14.126 | 0.100 |  |  |
| 16 | 5.493 | 0.943 | 1.51680 | 64.2 |
| 17 | 6.501 | 0.500 | 2.00069 | 25.5 |
| 18 | 3.992 | d18 |  |  |
| 19* | 13.349 | 2.402 | 1.54358 | 55.7 |
| 20* | −11.443 | 0.100 |  |  |
| 21* | −13.724 | 0.700 | 1.60641 | 27.2 |
| 22 | 412.266 | d22 |  |  |
| 23 | ∞ | 0.300 | 1.51680 | 64.2 |
| 24 | ∞ | 0.560 |  |  |
| 25 | ∞ | 0.500 | 1.51680 | 64.2 |
| 26 | ∞ | — |  |  |

The asterisk (*) designates an aspherical surface which is rotationally symmetrical with respect to the optical axis.

TABLE 18

ZOOM LENS SYSTEM DATA
Zoom Ratio 17.80

|  | Short Focal Length Extremity | Intermediate Focal Length | Long Focal Length Extremity |
|---|---|---|---|
| FNO. | 3.6 | 5.0 | 6.0 |
| f | 4.55 | 19.00 | 81.00 |
| W | 43.9 | 11.4 | 2.9 |
| Y | 3.70 | 3.88 | 3.88 |
| fB | 0.59 | 0.59 | 0.59 |
| L | 47.99 | 61.61 | 71.67 |
| d6 | 0.411 | 15.525 | 27.677 |
| d12 | 16.092 | 5.568 | 0.900 |
| d18 | 6.054 | 9.728 | 18.899 |
| d22 | 3.621 | 8.974 | 2.381 |

TABLE 19

Aspherical Surface Data (the aspherical surface coefficients not indicated are zero (0.00)):

| Surf. No. | K | A4 | A6 | A8 | A10 |
|---|---|---|---|---|---|
| 7 | 0.000 | 0.6047E−04 | −0.3864E−05 | 0.2593E−07 |  |
| 11 | 0.000 | −0.2791E−03 | −0.3907E−04 | 0.2124E−05 | −0.3542E−07 |
| 12 | 0.000 | −0.1490E−03 | −0.4416E−04 | 0.2706E−05 | −0.5900E−07 |
| 14 | −1.000 | −0.2402E−05 | 0.6571E−05 | 0.1235E−05 | −0.1932E−06 |
| 15 | 0.000 | 0.2516E−03 | 0.2655E−04 | −0.2084E−05 |  |
| 19 | 0.000 | −0.2113E−03 | 0.4600E−04 | −0.3840E−05 | 0.8524E−07 |
| 20 | 0.000 | 0.2789E−02 | −0.1753E−03 | 0.1696E−05 | 0.6986E−07 |
| 21 | 0.000 | 0.2649E−02 | −0.1939E−03 | 0.4541E−05 |  |

TABLE 20

LENS GROUP DATA

| Lens Group | 1st Surf. | Focal Length |
|---|---|---|
| 1 | 1 | 41.52 |
| 2 | 7 | −6.07 |
| 3 | 14 | 11.28 |
| 4 | 19 | 23.33 |

The numerical values of each condition for each embodiment are shown in Table 21.

TABLE 21

|  | Embod. 1 | Embod. 2 | Embod. 3 | Embod. 4 | Embod. 5 |
|---|---|---|---|---|---|
| Cond. (1) | 2.01 | 2.02 | 1.98 | 2.02 | 2.02 |
| Cond. (2) | 68.7 | 74.3 | 71.05 | 72.9 | 72.9 |
| Cond. (3) | 0.37 | 0.36 | 0.44 | 0.50 | 0.50 |
| Cond. (4) | −6.78 | −6.79 | −6.82 | −6.95 | −6.85 |
| Cond. (5) | 0.244 | 0.244 | 0.226 | 0.288 | 0.269 |
| Cond. (6) | 95.0 | 95.0 | 90.2 | 90.2 | 90.2 |

Furthermore, the image-shake correction angle, the image-shake amount, and the image-shake correction amount of an image-stabilizing operation, when focusing on an object at infinity at the long focal length extremity, are shown for each numerical embodiment in FIG. 22.

TABLE 22

|  | Embod. 1 | Embod. 2 | Embod. 3 | Embod. 4 | Embod. 5 |
|---|---|---|---|---|---|
| Image-shake Correction Angle (°) | 0.4 | 0.4 | 0.4 | 0.4 | 0.4 |
| Image-shake Amount (mm) | 0.566 | 0.566 | 0.565 | 0.566 | 0.565 |
| Image-shake Correction Amount (mm) | 0.282 | 0.280 | 0.286 | 0.280 | 0.280 |

As can be understood from Table 21, the first through fifth numerical embodiments satisfy conditions (1) through (6). Furthermore, as can be understood from the aberration diagrams, the various aberrations are suitably corrected. Furthermore, as shown by the diagrams of FIGS. 10, 20, 30, 40 and 50 of lateral aberrations that occurred during an image-stabilizing operation, a superior optical quality can be achieved during an image-stabilizing operation.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A high zoom-ratio zoom lens system comprising:
   a positive first lens group, a negative second lens group, a positive third lens group, and a positive fourth lens group, in that order from an object side,
   wherein upon zooming from a short focal length extremity to a long focal length extremity, at least the first through third lens groups move along an optical axis in a manner so that a distance between said first lens group and said second lens group increases, a distance between said second lens group and said third lens group decreases, and a distance between said third lens group and said fourth lens group increases, wherein an amount of movement of said first lens group during zooming is larger than that of said third lens group,
   wherein the lens element which is provided closest to the object side within said third lens group has an aspherical surface formed on each side thereof,
   wherein said third lens group comprises an image-shake correction lens group which is moved in a direction orthogonal to the optical axis to change an imaging position in order to correct image shake, and
   wherein the following conditions (4), (5) and (6) are satisfied:

$$-8 < F1/F2 < -5 \qquad (4);$$

$$0.2 < (M3t/M3w)/(M2t/M2w) < 0.4 \qquad (5);$$

$$\nu 1 P1 > 90 \qquad (6), \text{wherein}$$

F1 designates a focal length of said first lens group,

F2 designates a focal length of said second lens group,

M3t designates a lateral magnification of said third lens group when focusing on an object at infinity at the long focal length extremity, M3w designates a lateral magnification of said third lens group when focusing on an object at infinity at the short focal length extremity, M2t designates a lateral magnification of said second lens group when focusing on an object at infinity at the long focal length extremity, M2w designates a lateral magnification of said second lens group when focusing on an object at infinity at the short focal length extremity, and ν1P1 designates an Abbe number with respect to the d-line of a positive lens element which is provided closest to the object side within said first lens group.

2. The high zoom-ratio zoom lens system according to claim 1, wherein the following condition (1) is satisfied:

$$1.5 < (1-M3t) \cdot M4t < 3 \qquad (1),\text{wherein}$$

M4t designates a lateral magnification of said fourth lens group when focusing on an object at infinity at the long focal length extremity.

3. The high zoom-ratio zoom lens system according to claim 1, wherein the following condition (2) is satisfied:

$$\nu 3Pa > 64 \qquad (2),\text{wherein}$$

ν3Pa designates an average Abbe number with respect to the d-line of positive lens elements which are provided in said third lens group.

4. The high zoom-ratio zoom lens system according to claim 1, wherein the following condition (3) is satisfied:

$$0.35 < n3Na - n3Pa \qquad (3),\text{wherein}$$

n3Na designates an average refractive index at the d-line of negative lens elements which are provided within said third lens group, and n3Pa designates an average refractive index at the d-line of positive lens elements which are provided within said third lens group.

5. The high zoom-ratio zoom lens system according to claim 1, wherein said third lens group comprises a positive lens element, a cemented lens provided with a positive lens element and a negative lens element; and a negative lens element, in that order from the object side.

6. The high zoom-ratio zoom lens system according to claim 1, wherein said third lens group comprises a positive lens element, and a cemented lens provided with a positive lens element and a negative lens element, in that order from the object side.

* * * * *